United States Patent
Ueno

(10) Patent No.: US 11,873,067 B2
(45) Date of Patent: Jan. 16, 2024

(54) DEVICE, METHOD, AND PROGRAM FOR CONTROLLING SHIP BODY

(71) Applicant: FURUNO ELECTRIC CO., LTD., Nishinomiya (JP)

(72) Inventor: Hideki Ueno, Takarazuka (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 655 days.

(21) Appl. No.: 16/909,978

(22) Filed: Jun. 23, 2020

(65) Prior Publication Data

US 2020/0407030 A1    Dec. 31, 2020

(30) Foreign Application Priority Data

Jun. 28, 2019   (JP) ................. 2019-122022

(51) Int. Cl.
  *B63B 79/40*    (2020.01)
  *B63B 79/10*    (2020.01)

(52) U.S. Cl.
  CPC .............. *B63B 79/40* (2020.01); *B63B 79/10* (2020.01)

(58) Field of Classification Search
  CPC ................................. B63B 79/10; B63B 79/40
  USPC ......................................................... 701/21
  See application file for complete search history.

(56) References Cited

U.S. PATENT DOCUMENTS

| | | | |
|---|---|---|---|
| 5,268,844 A | 12/1993 | Carver et al. | |
| 6,884,128 B2 | 4/2005 | Okuyama et al. | |
| 8,340,847 B2 | 12/2012 | Sako et al. | |
| 8,943,988 B1 | 2/2015 | Guglielmo et al. | |
| 9,377,780 B1* | 6/2016 | Arbuckle | ............... G01C 21/20 |
| 9,718,527 B2 | 8/2017 | Ito | |
| 9,950,777 B2 | 4/2018 | Kishimoto et al. | |
| 10,167,798 B1* | 1/2019 | Van Camp | .............. F02D 29/02 |
| 10,723,431 B1* | 7/2020 | Przybyl | ................... G01S 19/52 |
| 11,188,080 B2 | 11/2021 | Akuzawa et al. | |
| 2004/0181322 A1 | 9/2004 | Okuyama | |
| 2004/0242091 A1 | 12/2004 | Okuyama et al. | |
| 2007/0134092 A1 | 6/2007 | Rosenkranz et al. | |
| 2007/0293103 A1 | 12/2007 | Kinoshita et al. | |

(Continued)

FOREIGN PATENT DOCUMENTS

| | | |
|---|---|---|
| CN | 109116838 A | 1/2019 |
| EP | 2 246 765 A1 | 11/2010 |

(Continued)

OTHER PUBLICATIONS

An Office Action mailed by the United States Patent and Trademark Office dated Jan. 17, 2023, which corresponds to U.S. Appl. No. 16/909,906 and is related to the present application.

(Continued)

*Primary Examiner* — Peter D Nolan
*Assistant Examiner* — Luke Huynh
(74) *Attorney, Agent, or Firm* — Studebaker & Brackett PC

(57) ABSTRACT

A ship body control device is provided, which includes a sensor, a propelling force controller, and an autopilot controller. The sensor measures a speed of a ship. The propelling force controller controls a propelling force of the ship. The autopilot controller outputs an instruction to reduce the propelling force to the propelling force controller, when a condition of canceling an automatic cruise in which the speed of the ship matches with an automatic ship speed setting is satisfied.

19 Claims, 21 Drawing Sheets

(56) References Cited

U.S. PATENT DOCUMENTS

| | | |
|---|---|---|
| 2009/0105962 A1 | 4/2009 | Woolf et al. |
| 2009/0288585 A1 | 11/2009 | Mitsui et al. |
| 2010/0121505 A1 | 5/2010 | Yamazaki et al. |
| 2012/0010766 A1 | 1/2012 | Sako et al. |
| 2015/0089427 A1 | 3/2015 | Akuzawa |
| 2016/0229511 A1 | 8/2016 | Kishimoto et al. |
| 2016/0280351 A1* | 9/2016 | Ito .................. B63B 34/60 |
| 2017/0137103 A1 | 5/2017 | Ito |
| 2017/0277189 A1 | 9/2017 | Johnson et al. |
| 2017/0285645 A1 | 10/2017 | Nakagawa |
| 2017/0349258 A1 | 12/2017 | Kishimoto et al. |
| 2017/0365175 A1 | 12/2017 | Harnett |
| 2018/0015994 A1 | 1/2018 | Kishimoto et al. |
| 2018/0334234 A1 | 11/2018 | Namba et al. |
| 2019/0039708 A1 | 2/2019 | Hayes et al. |
| 2019/0084662 A1 | 3/2019 | Wong et al. |
| 2019/0249906 A1 | 8/2019 | Wu et al. |
| 2019/0263483 A1 | 8/2019 | Li et al. |
| 2020/0407034 A1 | 12/2020 | Ueno |
| 2021/0078690 A1 | 3/2021 | Ueno |

FOREIGN PATENT DOCUMENTS

| | | |
|---|---|---|
| EP | 3173324 A1 | 5/2017 |
| EP | 3 214 523 A1 | 9/2017 |
| JP | S58-099198 U | 7/1983 |
| JP | H08-198185 A | 8/1996 |
| JP | H10-109693 A | 4/1998 |
| JP | 2004-034805 A | 2/2004 |
| JP | 2004-142537 A | 5/2004 |
| JP | 2004-142538 A | 5/2004 |
| JP | 2007-022422 A | 2/2007 |
| JP | 2008-155764 A | 7/2008 |
| JP | 2009-025860 A | 2/2009 |
| JP | 2011-235839 A | 11/2011 |
| JP | 2013-151241 A | 8/2013 |
| JP | 2014-024421 A | 2/2014 |
| JP | 2015-066979 A | 4/2015 |
| JP | 2016-144971 A | 8/2016 |
| JP | 2017-088111 A | 5/2017 |
| JP | 2017-178242 A | 10/2017 |
| JP | 2018-192976 A | 12/2018 |
| JP | 6513677 B2 | 5/2019 |
| KR | 10-2014-0080106 A | 6/2014 |
| KR | 10-2018-0044087 A | 5/2018 |
| WO | 2016/104030 A1 | 6/2016 |
| WO | 2016/104031 A1 | 6/2016 |
| WO | 2016/109832 A2 | 7/2016 |
| WO | 2018/100748 A1 | 6/2018 |
| WO | 2018/228670 A1 | 12/2018 |

OTHER PUBLICATIONS

Das et al., "Diesel Engine Control and Protection Monitoring using PID Controller", 2019 Innovations in Power and Advanced Computing Technologies (i-PACT), Mar. 22-23, 2019, pp. 1-6, IEEE.

Petratos et al., "A novel robust MPC based aircraft auto-throttle for performing 4D contract flights", 2013 9th Asian Control Conference (ASCC), Jun. 23-26, 2013, pp. 1-6, IEEE.

Schöley et al., "Application of a modified error governor to electronic throttle control", 2017 22nd International Conference on Methods and Models in Automation and Robotics (MMAR), Aug. 28-31, 2017, pp. 815-819, IEEE.

Lee et al., "Assessment of Energy Savings With Variable Speed Drives in Ship's Cooling Pumps", IEEE Transactions on Energy Conversion, vol. 30, No. 4, Jun. 1, 2015, pp. 1288-1298, IEEE.

Haifeng et al., "The Speed Control of Marine Main Engine", 2014 Sixth International Conference on Measuring Technology and Mechatronics Automation, Jan. 10-11, 2014, pp. 770-773, IEEE.

Jiang et al., "An Integrated Control Simulation System of Ship Motion and Main Propulsion", 2014 IEEE International Conference on Information and Automation (ICIA), Jul. 28-30, 2014, pp. 865-869, IEEE.

Oh et al., "System Identification of a Model Ship Using a Mechatronic System", IEEE/ASME Transactions on Mechatronics, vol. 15, No. 2, Jun. 16, 2009, pp. 316-320, IEEE.

Micheau et al., "Engine speed limiter for watercrafts", IEEE Transactions on Control Systems Technology, vol. 14, No. 3, Apr. 24, 2006, pp. 579-585, IEEE.

An Office Action mailed by the United States Patent and Trademark Office dated Oct. 17, 2022, which corresponds to U.S. Appl. No. 17/015,801, and is related to the present application.

The extended European search report issued by the European Patent Office dated Nov. 30, 2020, which corresponds to European Patent Application No. 20181370.6-1015 and is related to U.S. Appl. No. 16/909,978.

The extended European search report issued by the European Patent Office dated Dec. 10, 2020, which corresponds to European Patent Application No. 20182258.2-1015 and is related to U.S. Appl. No. 16/909,978.

An Office Action mailed by the United States Patent and Trademark Office dated Jan. 31, 2023, which corresponds to U.S. Appl. No. 17/015,801, and is related to the present application.

An Office Action mailed by the United States Patent and Trademark Office dated Mar. 3, 2023, which corresponds to U.S. Appl. No. 17/018,521, and is related to the present application.

The extended European search report issued by the European Patent Office dated Feb. 26, 2021, which corresponds to European Patent Application No. 20195840.2-1015 and is related to U.S. Appl. No. 16/909,978.

The extended European search report issued by the European Patent Office dated Dec. 17, 2020, which corresponds to European Patent Application No. 20195841.0-1202 and is related to U.S. Appl. No. 16/909,978.

Communication pursuant to Article 94(3) EPC issued by the European Patent Office dated Dec. 23, 2021, which corresponds to European Patent Application No. 20 195 841.0-1202 and is related to U.S. Appl. No. 16/909,978.

Notice of Allowance mailed by the United States Patent and Trademark Office dated Sep. 12, 2023, which corresponds to U.S. Appl. No. 17/018,521, and is related to the present application.

Communication pursuant to Article 94(3) EPC issued by the European Patent Office dated Sep. 14, 2023, which corresponds to European Patent Application No. 20181370.6-1009 and is related to the present application.

* cited by examiner

RETURN TO SPECIFIED POINT : SHIP SPEED CONTROL

RETURN TO SPECIFIED POINT : SHIP SPEED CONTROL

ENTERING INTO WATCH AREA : SHIP SPEED SELECTION NOTIFICATION

ENTERING INTO WATCH AREA : SHIP SPEED SELECTION NOTIFICATION

DECELERATION DUE TO PITCH CHANGE :
SHIP SPEED SELECTION NOTIFICATION

DECELERATION DUE TO PITCH CHANGE :
SHIP SPEED SELECTION NOTIFICATION

URGENT BUTTON OPERATION DURING AUTOMATIC CRUISE

URGENT BUTTON OPERATION DURING AUTOMATIC CRUISE

TIMER DECELERATION

TIMER DECELERATION

DEVICE, METHOD, AND PROGRAM FOR CONTROLLING SHIP BODY

CROSS-REFERENCE TO RELATED APPLICATION(S)

The application claims priority under 35 U.S.C. § 119 to Japanese Patent Application No. 2019-122022, which was filed on Jun. 28, 2019, the entire disclosure of which is hereby incorporated by reference.

TECHNICAL FIELD

The present disclosure relates to a technology of a control of a ship body, such as a cruising speed of the ship body.

BACKGROUND

JP2004-142538A discloses a propulsion control device for a ship.

However, in the conventional ship body control, when performing an automatic cruise control, it is difficult to perform a safe control according to an external state.

SUMMARY

Therefore, one purpose of the present disclosure is to perform a safe ship body control according to an external state, including an automatic cruise.

According to one aspect of the present disclosure, a ship body control device is provided, which includes a sensor, a propelling force controller, and an autopilot controller. The sensor measures a speed of a ship. The propelling force controller controls a propelling force of the ship. The autopilot controller outputs an instruction to reduce the propelling force to the propelling force controller, when a condition of canceling an automatic cruise in which the speed of the ship matches with an automatic ship speed setting is satisfied.

With this configuration, when the automatic cruise is canceled, the propelling force is reduced at least temporarily and the ship speed reduces.

According to the present disclosure, a safe ship body control according to an external state including an automatic cruise can be performed.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
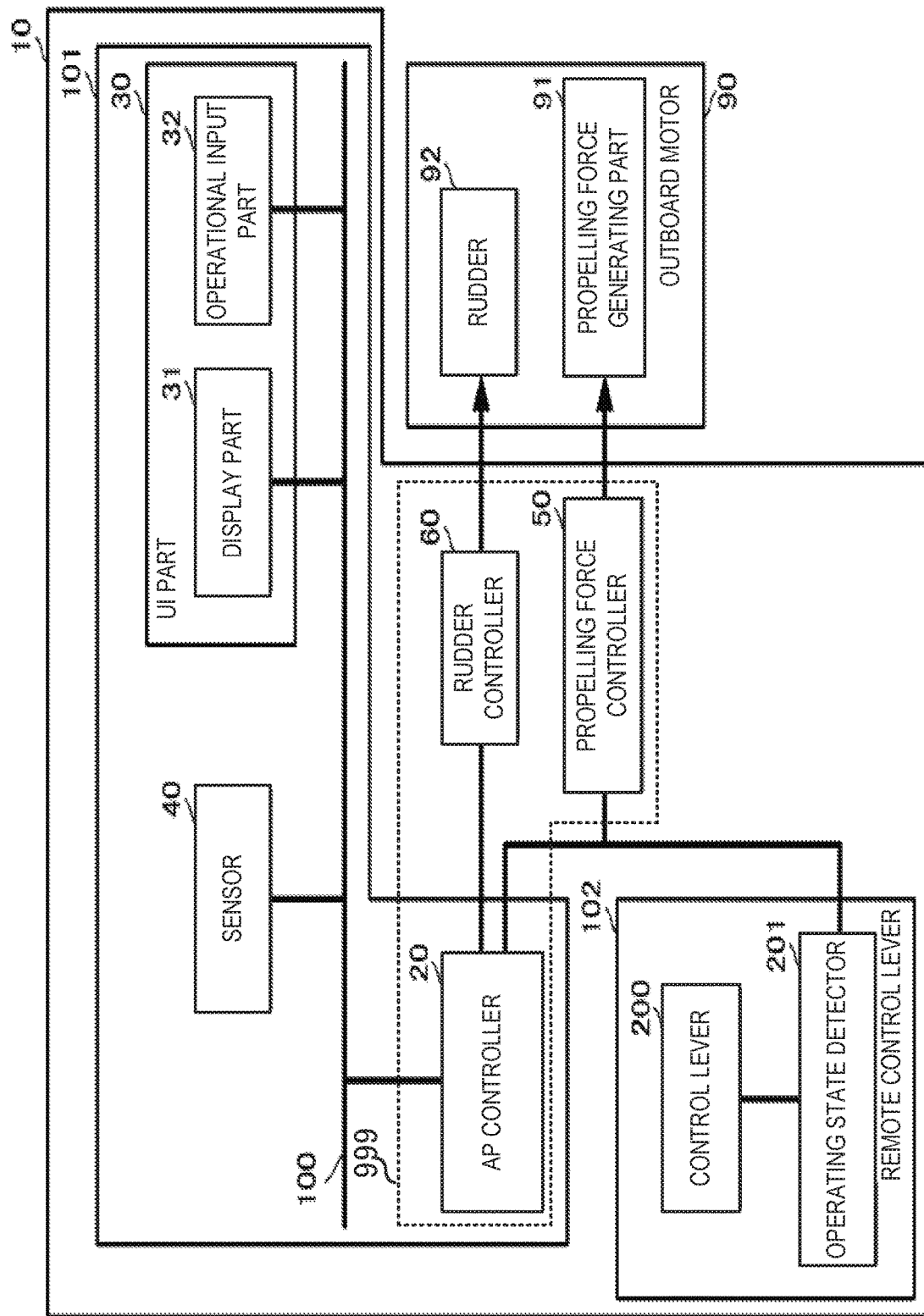
FIG. 1 is a functional block diagram illustrating a configuration of a ship body control device according to one embodiment of the present disclosure.

A ship body control device, a ship body control method, and a ship body control program according to one embodiment of the present disclosure are described with reference to the accompanying drawings. FIG. 1 is a functional block diagram illustrating a configuration of a ship body control device according to this embodiment of the present disclosure.

As illustrated in FIG. 1, a ship body control device 10 may include a main part 101, a remote control lever 102, a propelling force controller 50, and a rudder controller 60. The main part 101 may include an AP controller 20, a UI part 30, and a sensor 40. The remote control lever 102 may include a control lever 200 and an operating state detector 201.

The AP controller 20, the UI part 30, and the sensor 40 may be connected with each other via a data communication network 100 for a ship. The AP controller 20 may be connected with the propelling force controller 50, for example, through a communication network (e.g., CAN) for a propelling force. The AP controller 20 may be connected with the rudder controller 60 through an analog voltage or data communications.

A propelling force generating part 91 may be connected to the propelling force controller 50. The rudder controller 60 may be connected to a rudder 92. The propelling force generating part 91 and the rudder 92 are provided to, for example, an outboard motor 90. The propelling force generating part 91 and the rudder 92 may be provided to, for example, various kinds of propelling devices, such as an inboard motor and an inboard-outdrive motor.

The AP controller 20 is comprised of, for example, a processor, such as a CPU, and a memory. The memory may store a program executed by the AP controller 20. The memory may be also used during a calculation by the CPU. The AP controller 20 may correspond to an "autopilot controller" of the present disclosure.

The AP controller 20 may perform various kinds of controls (described later). The AP controller 20 may output instructions according to various kinds of controls to the propelling force controller 50 and the rudder controller 60. The AP controller 20, the propelling force controller 50 and the rudder controller 60 may also be implemented as "processing circuitry" 999.

The UI part 30 may be implemented by a given electronic circuit and electronic components. The UI part 30 may be a user interface part, and may include a display part 31 and an operational input part 32. The display part 31 is implemented by, for example, a liquid crystal panel. The operational input part 32 may be comprised of a switch and a button. The operational input part 32 may be physically independent from the display part 31, or may detect an operation to a screen of the display part 31 where the switch and the button are displayed. The UI part 30, containing the display part 31 and the operational input part 32, is collectively described as "a user setting interface" 30.

The UI part 30 may indicate display data from the AP controller 20 on the display part 31. The UI part 30 may output the contents of the operation relevant to an autopilot control accepted by the operational input part 32 to the AP controller 20. That is, the operational input part 32 may implement a function of an AP interface.

The sensor 40 may measure data (measurement data) of a speed, a bow direction, etc. of the ship. Note that the present disclosure may be applied to ships which typically travel on water or sea which are referred to as surface ships, and may also be applied to other types of ships including boats, dinghies, watercrafts, and vessels. The ship speed may be used for a control of the propelling force, and the bow direction may be used for a control of the rudder. For example, the sensor 40 is implemented by a positioning sensor utilizing positioning signals of a GNSS (e.g., GPS) and an inertia sensor (e.g., an acceleration sensor). Note that, for the acquisition of the bow direction, the sensor 40 may be, for example, a magnetic sensor. Moreover, according to the control performed by the ship body control device 10, the sensor 40 may be provided with a function for detecting the state of the ship and the state around the ship, such as a radar and a posture sensor, which detect a target object around the ship.

The sensor 40 may output the measurement data to the AP controller 20.

The propelling force controller 50 is implemented by, for example, a given electronic circuit. The propelling force controller 50 may generate a propelling force control signal according to an instruction from the AP controller 20, and output it to the propelling force generating part 91. The propelling force generating part 91 is, for example, an engine for the ship. In this case, the propelling force control signal is, for example, a signal which defines a throttle opening of an engine.

The rudder controller 60 is implemented by, for example, a given electronic circuit and a physical control mechanism of a rudder angle of a rudder. The rudder controller 60 may determine the rudder angle of the rudder 92 according to an instruction from the AP controller 20.

(Configuration of Remote Control Lever 102)

The control lever 200 of the remote control lever 102 may accept a user's operation for the manual cruise. The operating state detector 201 may be implemented by a sensor etc. The operating state detector 201 may detect an operating state of the control lever 200. The detection of the operating state by the operating state detector 201 may sequentially be performed at a given time interval. The operating state detector 201 may output the detected operating state (angle) of the control lever to the propelling force controller 50. The AP controller 20 may receive this operating state.

In such a configuration, the ship body control device 10 may perform various kinds of cruise controls of the ship described below. Note that, below, although the ship speed control is described concretely and description of the rudder angle control is omitted, the rudder angle control may also suitably be performed along the ship speed control.

(Ship Body Control During Auto Cruising Mode)

Figure 2:
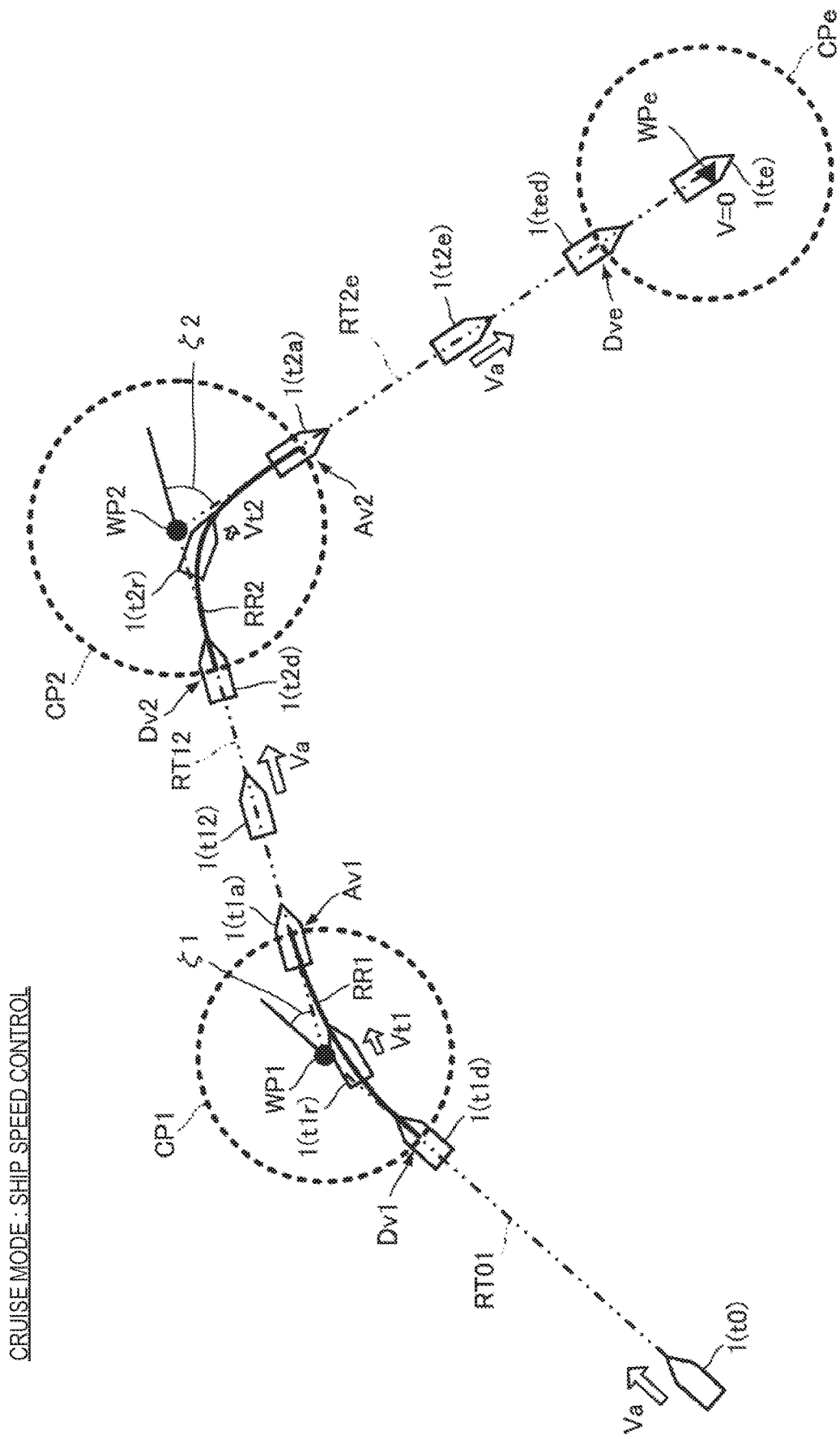
FIG. 2 is a view illustrating an outline of a ship body control during an auto cruising mode.

FIG. 2 is a view illustrating an outline of the ship body control during an auto cruising mode. As illustrated in FIG. 2, during the auto cruising mode, a ship 1 may stop at a destination point WPe via a heading change point WP1 and a heading change point WP2.

A user can set the heading change point WP1, the heading change point WP2, the destination point WPe, and a cruising route (the order of the heading change points through which the ship passes) by using the UI part 30. The AP controller 20 may store coordinates of the heading change point WP1, the heading change point WP2, the destination point WPe, and the cruising route which are set by the UI part 30.

Moreover, the user can set a speed (automatic ship speed Va) during cruising straight (cruising straight in setting) in the auto cruising mode by using the UI part 30. The AP controller 20 may store the automatic ship speed Va.

When the UI part 30 accepts the operational input of the automatic cruise from the user, the AP controller 20 may acquire position coordinates of the ship from the sensor 40, and set a route RT01 from a starting position of the automatic cruise (a position of the ship 1(*t*0) in FIG. 2) to the heading change point WP1. Note that the sensor 40 may sequentially measure the position coordinates of the ship, and output them to the AP controller 20 even after setting the route.

The AP controller 20 may give instructions to the propelling force controller 50 and the rudder controller 60 so that the ship 1 cruises along the route RT01 at the automatic ship speed Va. According to this control, the ship 1 may cruise along the route RT01 at a constant ship speed of the automatic ship speed Va. Note that, here, there may be various kinds of disturbances in the sea, such as waves, current, and wind. For this reason, the ship 1 seldom stays on the route RT01. Thus, the AP controller 20 may suitably control the propelling force and the rudder angle so that the ship 1 does not deviate largely from the route RT01. Therefore, the ship 1 can cruise along the route RT01 at the constant ship speed of the automatic ship speed Va. That is, the automatic ship speed Va is not simply a ship speed at each time point, but may be an average ship speed while the ship cruises on the route RT01. Alternatively, the route RT01 may be divided into a plurality of sections, and the automatic ship speed Va may be an average speed in each section. Note that the following automatic ship speed Va in each route may be similar.

When the ship 1 cruises at the automatic ship speed Va, it may approach the heading change point WP1 and enter into a heading change area CP1 (see the ship 1(*t1d*) in FIG. 2). A radius of the heading change area CP1 may automatically be calculated by the AP controller 20 based on the automatic ship speed Va, a heading change angle 1 at the heading change point WP1, and a heading change rate set so that the ship 1 can safely change the heading. The AP controller 20 may detect entering into the heading change area CP1 by using a spatial relationship between the position coordinates of the ship measured by the sensor 40 and the coordinates indicative of the heading change area CP1.

The AP controller 20 may cancel the control at the automatic ship speed Va, and give a deceleration control instruction Dv1 to the propelling force controller 50. The propelling force controller 50 may perform a control for reducing the propelling force produced by the propelling force generating part 91, according to the deceleration control instruction Dv1. Here, the user can set a rate of deceleration and an amount of deceleration through the UI part 30. Moreover, the AP controller 20 may automatically calculate the deceleration rate and the deceleration amount based on the heading change angle 1 set at the heading change point WP1. As illustrated in FIG. 2, the heading change angle 1 may be an angle formed by the route RT01 (the route to the heading change point WP1) and a route RT12 (a route from the heading change point WP1 to the heading change point WP2).

The ship 1 may slow down by this control. Then, the ship 1 may cruise inside the heading change area CP1, changing the heading at a decelerated ship speed Vt1 (<Vo). Here, the AP controller 20 may set the ship speed Vt1 and the heading change rate so that the ship approaches the heading change point WP1 safely and as much as possible, and give them to the propelling force controller 50 and the rudder controller 60.

The ship 1 may cruise while changing the heading in the heading change area CP1 so that the ship goes toward the heading change point WP2, and leave the heading change area CP1 (see the ship 1(*t1a*) in FIG. 2). The AP controller 20 may detect leaving from the heading change area CP1 by using the spatial relationship between the position coordinates of the ship measured by the sensor 40 and the coordinates indicative of the heading change area CP1.

The AP controller 20 may resume the control at the automatic ship speed Va, and give an acceleration control instruction Av1 to the propelling force controller 50. Then, the AP controller 20 may give instructions to the propelling force controller 50 and the rudder controller 60 so that the ship cruises along the route RT12 at the automatic ship speed Va. According to this control, the ship 1 may cruise along the route RT12 at a constant ship speed of the automatic ship speed Va (see the ship 1(*t12*) in FIG. 2).

When the ship 1 cruises at the automatic ship speed Va, it may approach the heading change point WP2 and then enter into a heading change area CP2 (see the ship 1(*t2d*) in FIG. 2). The AP controller 20 may detect entering into the heading change area CP2 by using the spatial relationship between the position coordinates of the ship measured by the sensor 40 and the coordinates indicative of the heading change area CP2.

The AP controller 20 may cancel the control at the automatic ship speed Va, and give a deceleration control instruction Dv2 to the propelling force controller 50. The propelling force controller 50 may perform a control for reducing the propelling force produced by the propelling force generating part 91 according to the deceleration control instruction Dv2. As illustrated in FIG. 2, a heading change angle may be an angle formed by the route RT12 (a route from the heading change point WP1 to the heading change point WP2) and a route RT2*e* (a route from the heading change point WP2 to the destination point WPe).

The ship 1 may slow down by this control. Then, the ship 1 may cruise inside the heading change area CP2, while changing the heading at a decelerated ship speed Vt2 (<Vo). Here, the AP controller 20 may set the ship speed Vt2 and a heading change rate so that the ship approaches the heading change point WP2 safely and as much as possible, and it may give them to the propelling force controller 50 and the rudder controller 60.

The ship 1 may cruise inside the heading change area CP2 while changing the heading toward the destination point WPe, and then leave the heading change area CP2 (see the ship 1(*t2a*) in FIG. 2). The AP controller 20 may detect leaving from the heading change area CP2 by using the spatial relationship between the position coordinates of the ship measured by the sensor 40 and the coordinates indicative of the heading change area CP2.

The AP controller 20 may resume the control at the automatic ship speed Va, and give an acceleration control instruction Av2 to the propelling force controller 50. Then, the AP controller 20 may give instructions to the propelling force controller 50 and the rudder controller 60 so that the ship cruises along the route RT2*e* at the automatic ship speed Va. According to this control, the ship 1 may cruise along the route RT2*e* at a constant ship speed of the automatic ship speed Va (see the ship 1(*t2e*) in FIG. 2).

When the ship 1 cruises at the automatic ship speed Va, it may approach the destination point WPe and then enter into a destination area CPe (see the ship 1(*ted*) in FIG. 2). A radius of the destination area CPe may automatically be calculated by the AP controller 20 based on the automatic ship speed Va and a stop distance according to the deceleration rate set so that the ship 1 can slow down and stop safely. The AP controller 20 may detect entering into the destination area CPe by using the spatial relationship between the position coordinates of the ship measured by the sensor 40 and the coordinates indicative of the destination area CPe.

The AP controller 20 may cancel the control at the automatic ship speed Va, and give a deceleration control instruction Dve to the propelling force controller 50. Here, the AP controller 20 may set the deceleration control instruction Dve, for example, to suspend the output of the propelling force generating part 91. Note that, if the safety upon cruising of the ship 1 is spoiled by immediately suspending the output of the propelling force generating part 91, the AP controller 20 may set the deceleration control instruction Dve to suspend the output after the output is dropped.

The propelling force controller 50 may perform a control for reducing and suspending the propelling force produced by the propelling force generating part 91 according to the deceleration control instruction Dve. By this control, the ship 1 may slow down and then stop at a position as closest to the destination point WPe as possible.

By using this function, while the ship 1 cruises at the constant automatic ship speed Va, it can pass through near the heading change points WP1 and WP2 which are desired by the user, and then stop at the destination point WPe. Further, by using the configuration of this embodiment, the safety during the heading change and during the final stop may be secured. That is, while the user secures the safety, the auto cruise can be realized in which the ship moves at the desired automatic ship speed Va as much as possible.

Moreover, with this configuration, since the automatic ship speed Va of each route RT is determined, the AP controller 20 of the ship body control device 10 can estimate an estimated time of arrival to the destination point WPe at a start of the automatic cruise. In addition, the ship body control device 10 can display, for example, the estimated time of arrival on the display part 31. Therefore, the user can easily grasp the estimated time of arrival.

Moreover, with this configuration, the AP controller 20 of the ship body control device 10 can estimate an elapsed time of the heading change at each heading change point WP. That is, the AP controller 20 of the ship body control device 10 can again estimate the estimated time of arrival for every heading change point WP and update it with an estimated time of arrival with higher precision. Therefore, the user can easily grasp the higher-precision estimated time of arrival.

Although in the above description there are two heading change points, the number of heading change points is not limited to this and the above-described control can be performed according to the number of heading change points.

Figure 3:
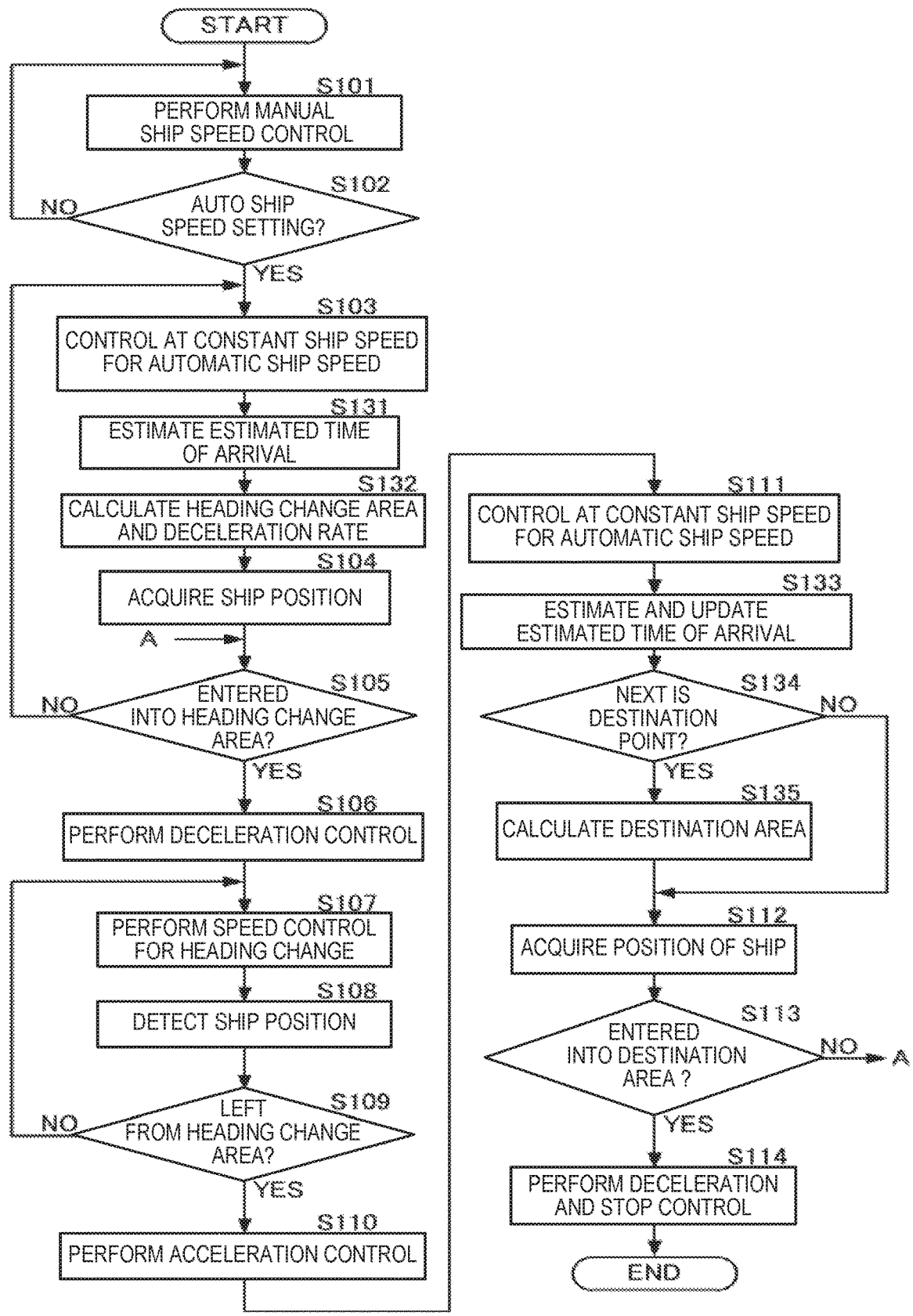
FIG. 3 is a flowchart of the control during the auto cruising mode.

The above-described control is implemented by, for example, the following method (program). FIG. 3 is a flowchart of the control during an auto cruising mode.

For example, while a manual ship speed control is performed (Step S101), if the automatic cruise at the automatic ship speed Va is set (Step S102: YES), the AP controller 20 may transit to the auto cruising mode. If the automatic cruise is not set (Step S102: NO), the AP controller 20 may continue the manual ship speed control (Step S101).

If the AP controller 20 transits to the auto cruising mode, it may then perform the control in which the ship cruises at the constant ship speed of the automatic ship speed Va (Step S103). The AP controller 20 may estimate the estimated time of arrival (Step S131). The AP controller 20 may calculate the radius and the deceleration rate of the next heading change area (Step S132). The AP controller 20 may sequentially acquire the position coordinates of the ship from the sensor 40 during this automatic cruise (Step S104).

Until the AP controller 20 detects entering into the heading change area during the automatic cruise (Step S105: NO), it may continue the control in which the ship cruises at the constant ship speed of the automatic ship speed Va.

If the AP controller 20 detects entering into the heading change area (Step S105: YES), it may output the deceleration control instruction Dv (Step S106). In the heading change area, the AP controller 20 may perform a speed control for the heading change (Step S107). The AP controller 20 may sequentially acquire the position coordinates of the ship from the sensor 40 during the heading change (Step S108).

Until the AP controller 20 detects leaving from the heading change area (Step S109: NO), it may continue the speed control for the heading change.

If the AP controller 20 detects leaving from the heading change area (Step S109: YES), it may output the acceleration control instruction Av (Step S110). The AP controller 20 may resume the control in which the ship cruises at the constant ship speed of the automatic ship speed Va (Step S111). The AP controller 20 may estimate and update the estimated time of arrival (Step S133). If the next location is the destination point (Step S134: YES), the AP controller 20 may calculate the radius of the destination area and the deceleration rate (Step S135). The AP controller 20 may sequentially acquire the position coordinates of the ship from the sensor 40 during the automatic cruise (Step S112).

Until the AP controller 20 detects entering into the destination area during the automatic cruise (Step S113: NO), it may continue the control in which the ship cruises at the constant ship speed of the automatic ship speed Va (it returns to Step S105).

If the AP controller 20 detects entering into the destination area (Step S113: YES), it may perform a deceleration and stop control (Step S114).

(Ship Body Control during Return Mode)

Figure 4A:
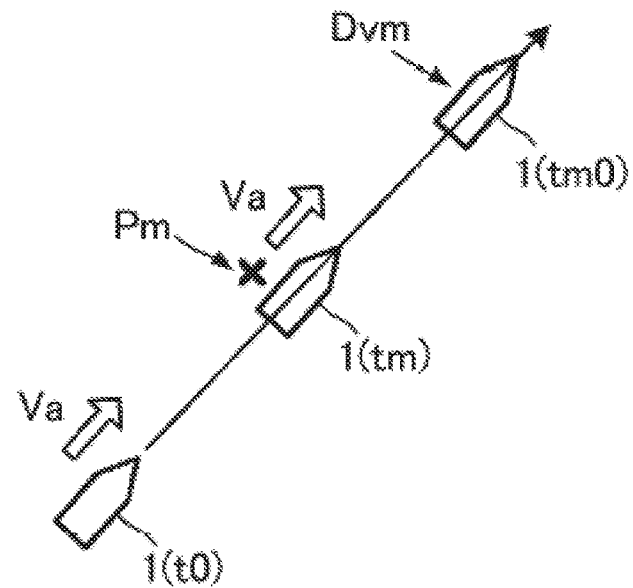
FIGS. 4A and 4B are views illustrating an outline of a ship body control during a returning mode.
Figure 4B:
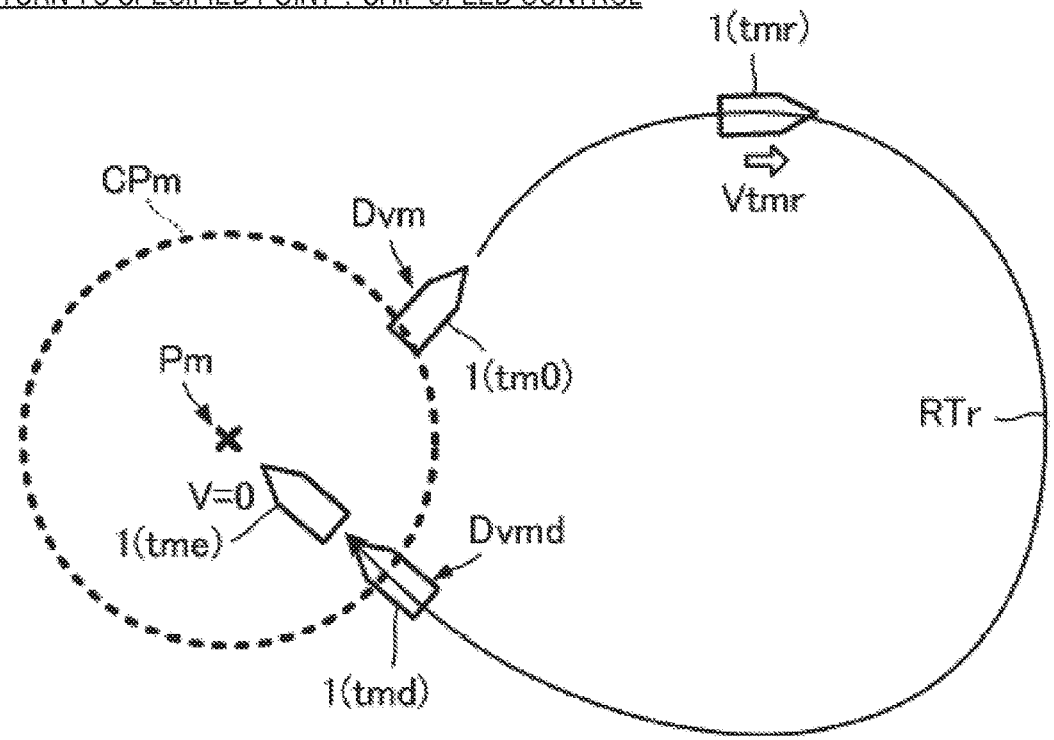

FIGS. 4A and 4B are views illustrating an outline of a ship body control during a returning mode, where FIG. 4A illustrates a case when a return instruction is generated and FIG. 4B illustrates a case during the returning control. As illustrated in FIGS. 4A and 4B, during the returning mode, when a specific position (a generating position of the return instruction) is instructed, the ship 1 may return to the specific position.

As illustrated in FIG. 4A, while the ship 1 cruises at the automatic ship speed Va, the user may generate a return instruction (see the ship 1(*tm*) in FIG. 4A). The return instruction can be implemented, for example, by the UI part 30 being provided with a portable device capable of performing wireless communications. The return instruction may be given to the AP controller 20. Thus, by using the portable device capable of performing wireless communications, the AP controller 20 can receive the return instruction wirelessly from a portable device of the user (e.g., a helmsman) who even falls in the water. This portable device and the UI part 30 may correspond to a "return accepting part" in the present disclosure.

When the return instruction is received, the AP controller 20 may determine position coordinates of a returning position Pm based on the position coordinates of the ship from the sensor 40.

When the return instruction is received, the AP controller 20 may cancel the cruise at the automatic ship speed Va, and output a deceleration control instruction Dvm. Thus, the ship 1 may slow down (see the ship 1(*tm*0) in FIG. 4A).

The AP controller 20 may acquire the coordinates of the deceleration starting position. The AP controller 20 may set a returning route RTr as illustrated in FIG. 4B based on the coordinates of the deceleration starting position and the coordinates of the returning position Pm. Moreover, the AP controller 20 may set a returning ship speed Vtmr. The returning ship speed Vtmr may be a ship speed during the cruise on the returning route RTr. The returning route RTr and the returning ship speed Vtmr may be set, for example, in consideration of the safety, so that the ship 1 can arrive at the returning position Pm earliest.

When the ship 1 cruises at the returning ship speed Vtmr along the returning route RTr, it may approach the returning position Pm and then enter into a returning area CPm (see the ship 1(*tmd*) in FIG. 4B). The AP controller 20 may detect entering into the returning area CPm by using a spatial relationship between the position coordinates of the ship measured by the sensor 40 and the coordinates indicative of the returning area CPm.

The AP controller 20 may cancel the control at the returning ship speed Vtmr, and give a deceleration control instruction Dvmd to the propelling force controller 50. Here, the AP controller 20 may set the deceleration control instruction Dvmd so that the ship 1 stops at a position in the returning area CPm away from the returning position Pm by a given distance.

The propelling force controller 50 may perform a control for reducing and stopping the propelling force produced by the propelling force generating part 91 according to the deceleration control instruction Dvmd. Therefore, the ship 1 may stop at the position away from the returning position Pm by the given distance (see the ship 1(*tme*) in FIG. 4B).

By using this function, if the returning position Pm is set during the automatic cruise at the automatic ship speed Va, the ship body control device 10 can slow down the ship 1 and stop near the returning position Pm. Further, by using configuration of this embodiment, the safety upon cruising of the ship 1 during the returning may be secured.

Figure 5:
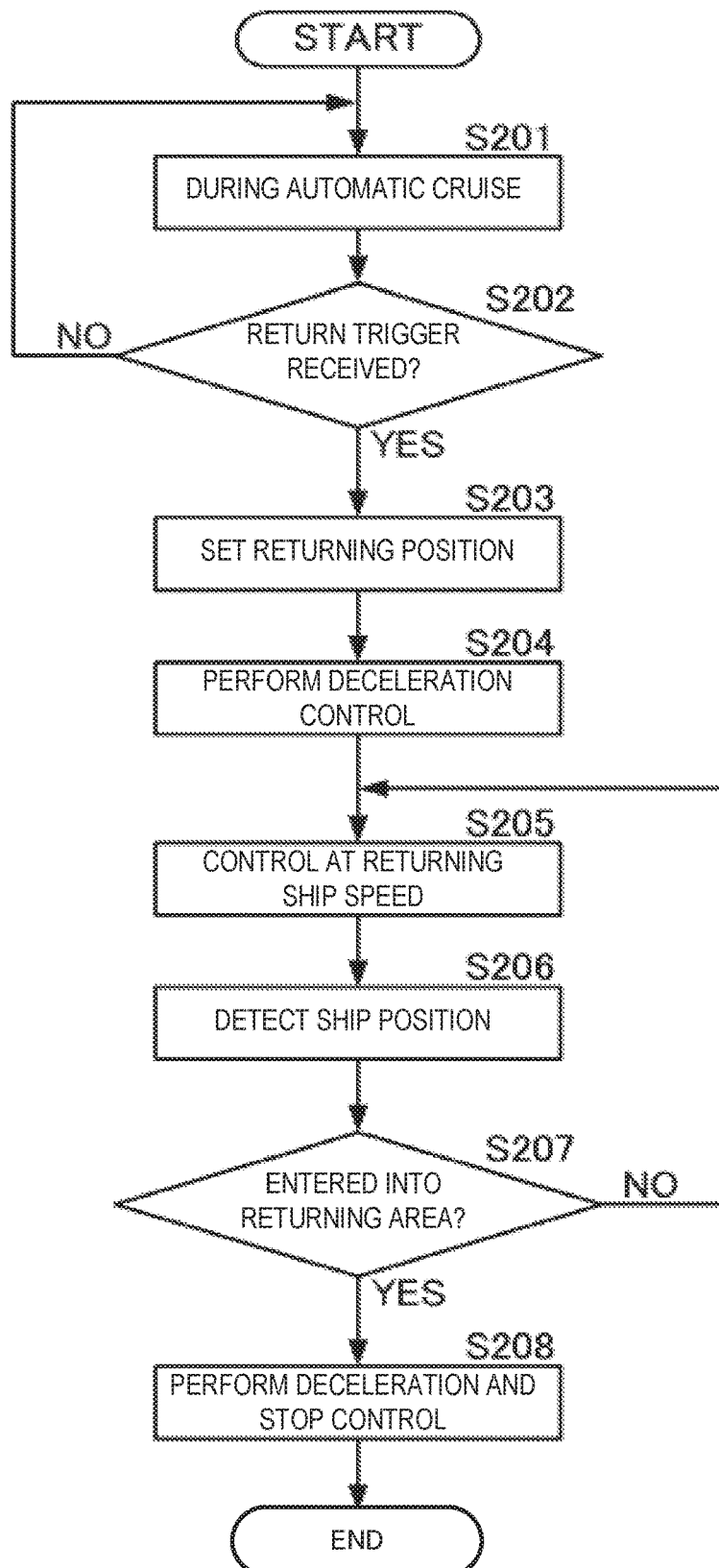
FIG. 5 is a flowchart of the control during the returning mode.

The above-described control is implemented by, for example, the following method (program). FIG. 5 is a flowchart of the control during the returning mode.

During the automatic cruise at the automatic ship speed Va (Step S201), if a return trigger is received (Step S202: YES), the AP controller 20 may transit to the returning mode. If the AP controller 20 does not receive the return trigger (Step S202: NO), it may continue the automatic cruise at the automatic ship speed Va.

If the AP controller 20 transits to the returning mode, it may acquire the position coordinates of the ship at a timing of receiving the return trigger, and set the returning position (Step S203).

The AP controller 20 may cancel the automatic cruise at the automatic ship speed Va to perform the deceleration control (Step S204). The AP controller 20 may perform the cruise control at the returning ship speed Vtmr after the deceleration control (Step S205). The AP controller 20 may sequentially acquire the position coordinates of the ship from the sensor 40 during the cruise on the returning route RTr (Step S206).

Until the AP controller 20 detects entering into the returning area CPm during the cruise on the returning route RTr (Step S207: NO), it may continue the control in which the ship cruises along the returning route RTr.

If the AP controller 20 detects entering into the returning area CPm (Step S207: YES), it may perform the deceleration and stop control (Step S208).

(Ship Body Control During Risk Detection)

Figure 6A:
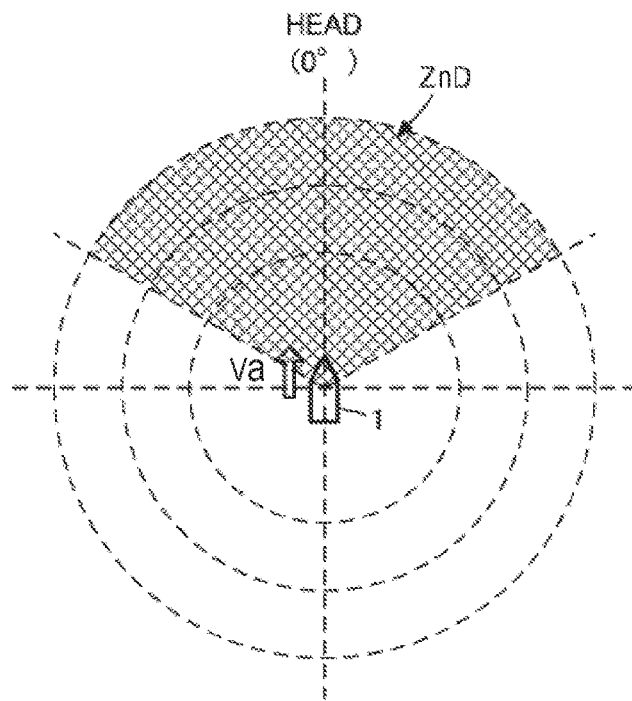
FIGS. 6A and 6B are views illustrating an outline of a ship body control during a risk detection.
Figure 6B:
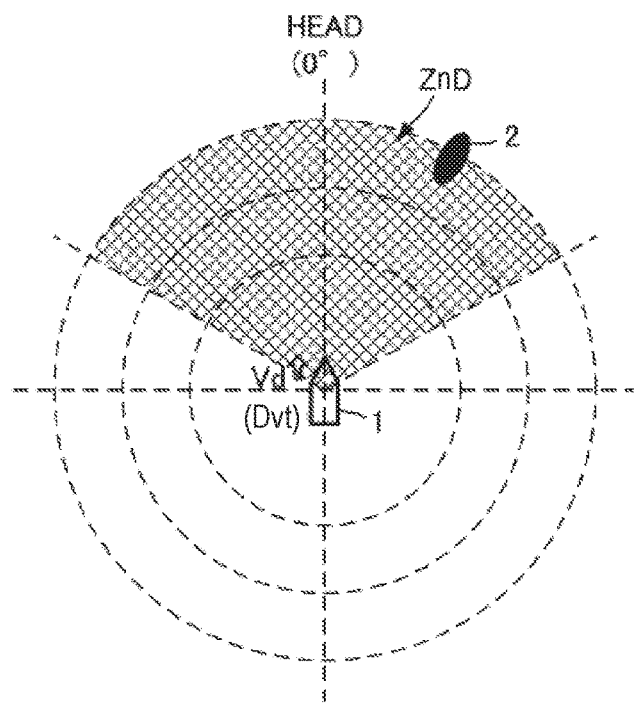

FIGS. 6A and 6B are views illustrating an outline of a ship body control during a risk detection. FIG. 6A illustrates a case where a target object is not detected within a risky area, and FIG. 6B illustrates a case where the target object is detected within the risky area. When performing the control of the automatic ship speed by the risky detection, the sensor 40 may have a target object detecting function, such as a radar.

The sensor 40 may detect a target object around the ship 1, and output the detection result to the AP controller 20. The AP controller 20 may determine whether the target object is detected within a risky area ZnD based on the detection result. The risky area ZnD may be set, for example, by a given direction range in the bow direction of the ship 1, as illustrated in FIGS. 6A and 6B.

As illustrated in FIG. 6A, if the AP controller 20 does not detect the target object within the risky area ZnD, it may continue the automatic cruise at the automatic ship speed Va.

As illustrated in FIG. 6B, if the AP controller 20 detects the target object within the risky area ZnD, it may output a deceleration control instruction Dvt. Thus, the ship 1 may slow down to a speed Vd.

The AP controller 20 may output the deceleration control instruction Dvt and the contents of a selection of the control after the deceleration (after the propelling force is reduced) to the UI part 30. The UI part 30 may display a display image indicative of the contents of the selection on the display part 31.

Figure 7A:
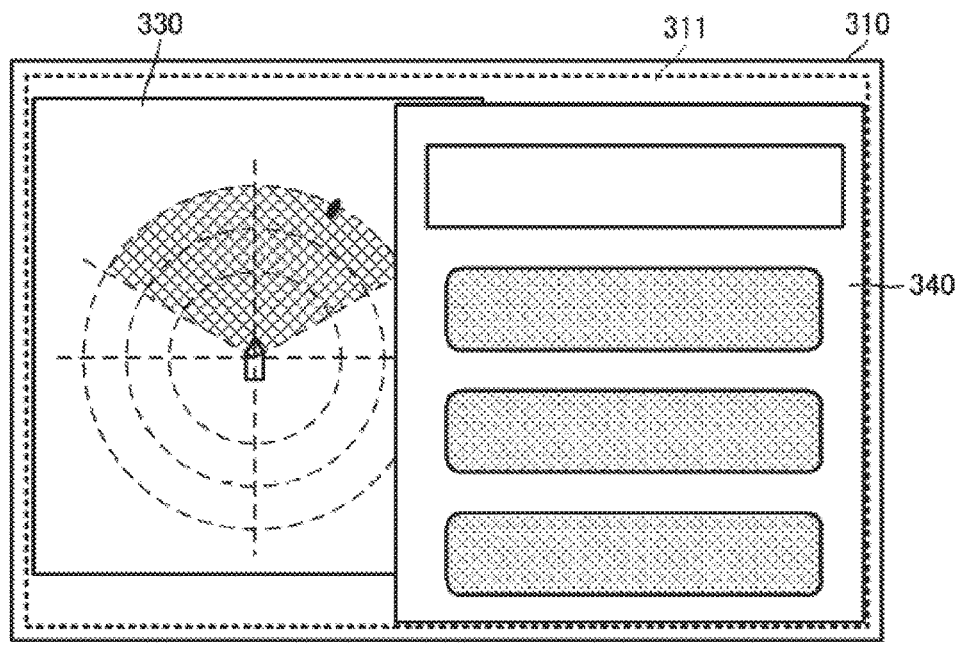
FIG. 7A is a view illustrating one display example of a display part.
Figure 7B:
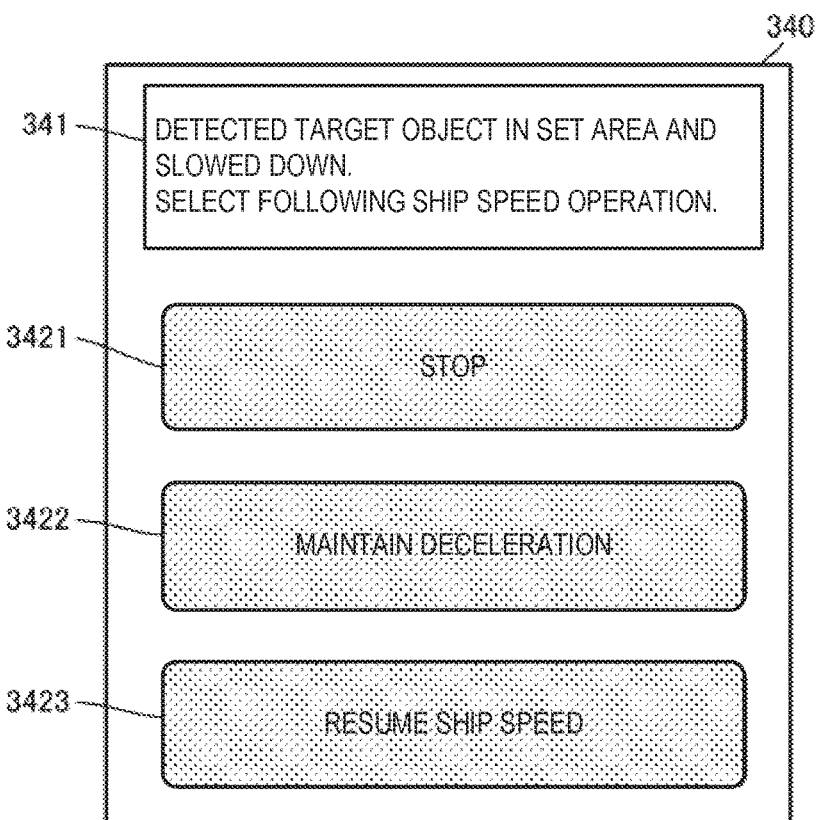
FIG. 7B is a view illustrating one display example of the contents of selection.

FIG. 7A is a view illustrating one display example of the display part, and FIG. 7B is a view illustrating one display example of the contents of the selection.

As illustrated in FIG. 7A, the display part 31 may display a display image 311 of a normal autopilot function, a target object detection image 330, and a selected contents notifying window 340 on a display screen 310. Note that, in FIG. 7A, the display part 31 may display the target object detection image 330 and the selected contents notifying window 340 so as to overlap them with the display image 311 of the normal autopilot function. However, the display part 31 may change the display from the display image 311 of the normal autopilot function to the selected contents notifying window 340. Here, if the target object detection image 330 is displayed simultaneously, it may be better because the position of the target object can be seen.

As illustrated in FIG. 7B, the selected contents notifying window 340 may have a notifying window 341, a stop button 3421, a deceleration maintaining button 3422, and a ship speed resuming button 3423. The AP controller 20 may display a notification of a deceleration start upon the detection of the risky target object and wording which urges a selection of operation, on the notifying window 341. When the operational input part 32 detects an operation of the stop button 3421, the AP controller 20 may generate a stop control instruction of the propelling force, and output it to the propelling force controller 50. If the operational input part 32 detects an operation of the deceleration maintaining button 3422, the AP controller 20 may generate a control instruction for maintaining the speed Vd during the deceleration, and output it to the propelling force controller 50. When the operational input part 32 detects an operation of the ship speed resuming button 3423, the AP controller 20 may generate a control instruction for resuming the automatic ship speed Va, and output it to the propelling force controller 50.

By using this function, the ship body control device 10 may slow down the ship when the risky target object is detected during the automatic cruise at the automatic ship speed Va, and therefore, the safety upon cruising of the ship 1 can be secured. Further, the user can select the ship speed control after the deceleration, and the ship body control device 10 can realize the ship body control suitable for the situation of the ship by the easy operation of the user.

Figure 8:
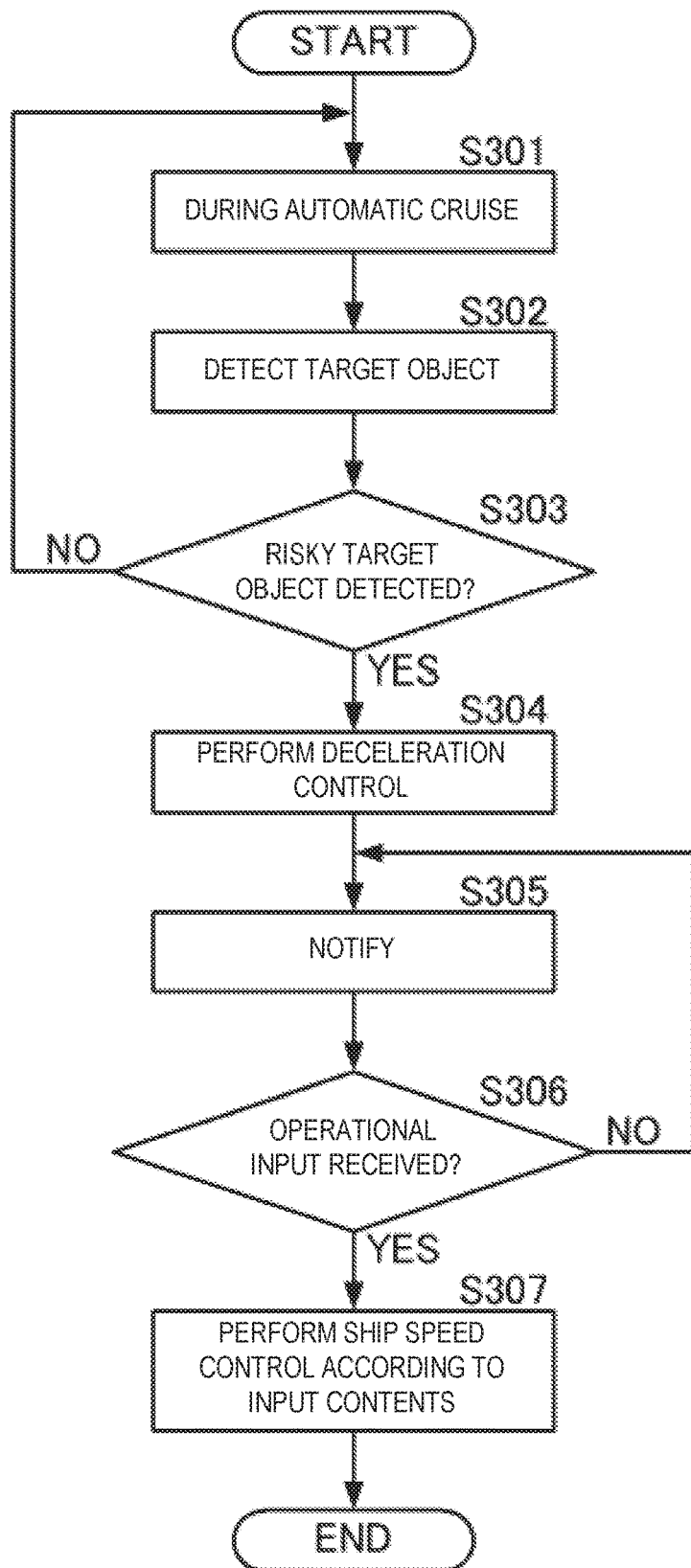
FIG. 8 is a flowchart of a control during a detection of a risky target object.

The above-described control is implemented by, for example, the following method (program). FIG. 8 is a flowchart of the control during the detection of the risky target object.

During the automatic cruise at the automatic ship speed Va (Step S301), the AP controller 20 may sequentially perform the target object detection (Step S302). Until the AP controller 20 detects the risky target object (Step S303: NO), it may continue the automatic cruise. If the AP controller 20 detects the risky target object (Step S303: YES), it may output the deceleration control instruction Dvt to perform the deceleration control (Step S304).

The AP controller 20 may perform the notification of the deceleration control and the notification of the contents of the selection of control after the deceleration, through the UI part 30 (Step S305). Until the AP controller 20 receives the operational input (Step S306: NO), it may continue the notification of the deceleration control and the notification of the contents of the selection of control after the deceleration.

If the AP controller 20 accepts the operational input (Step S306: YES), it may perform the ship speed control according to the contents of the input (Step S307).

Figure 9:
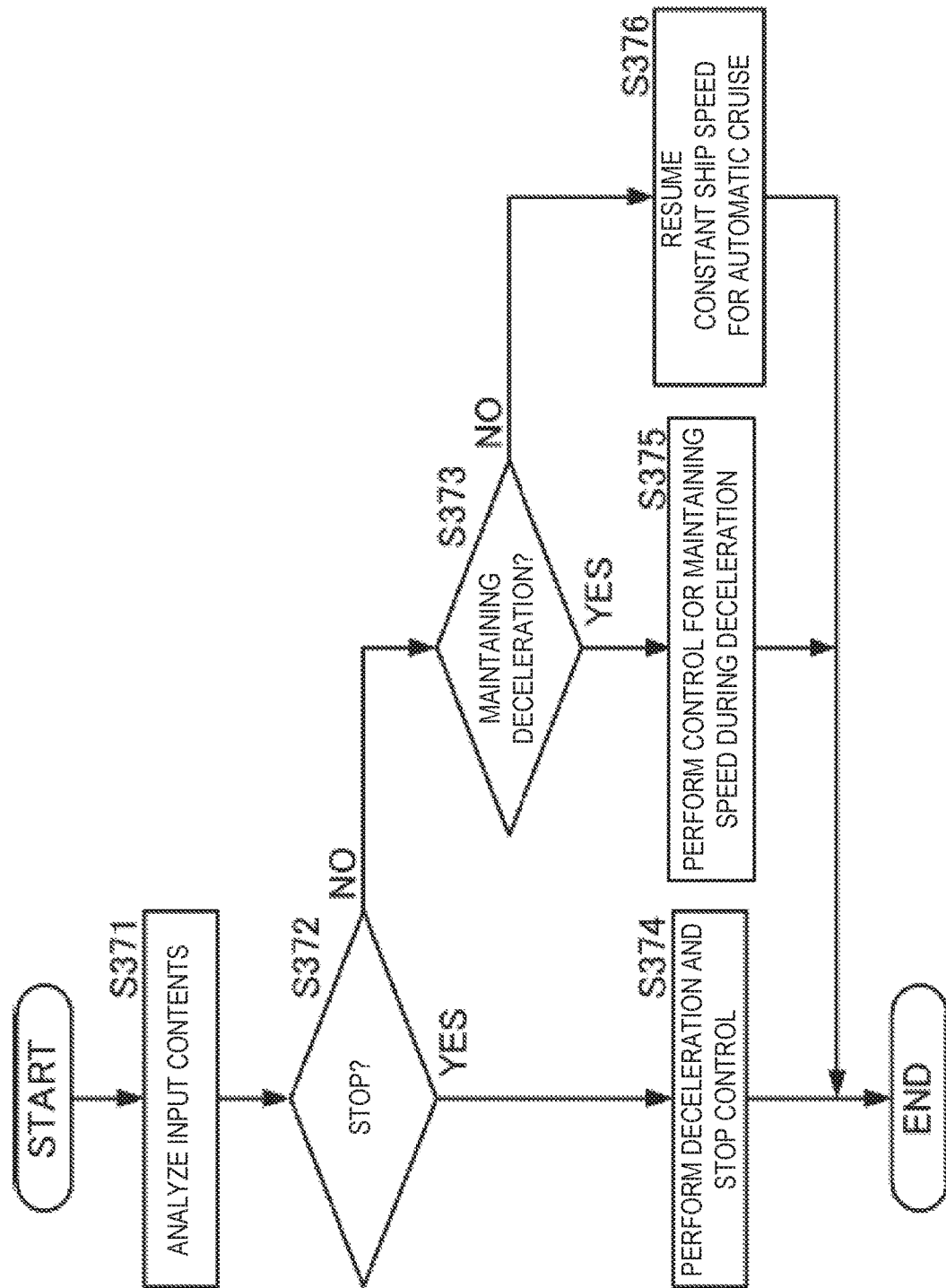
FIG. 9 is a flowchart of a ship speed control according to the contents of an operational input.

FIG. 9 is a flowchart of the ship speed control according to the contents of the operational input. If the AP controller 20 accepts the operational input, it may analyze the contents of the input (Step S371). If the stop button 3421 is operated (Step S372: YES), the AP controller 20 may perform the deceleration and stop control (Step S374). If the deceleration maintaining button 3422 is operated (Step S372: NO and Step S373: YES), the AP controller 20 may perform the control for maintaining the speed Vd during the deceleration (Step S375). If the ship speed resuming button 3423 is operated (Step S373: NO), the AP controller 20 may resume the automatic ship speed Va to perform the automatic cruise control (Step S376).

(Ship Body Control During Watch Mode)

Figure 10A:
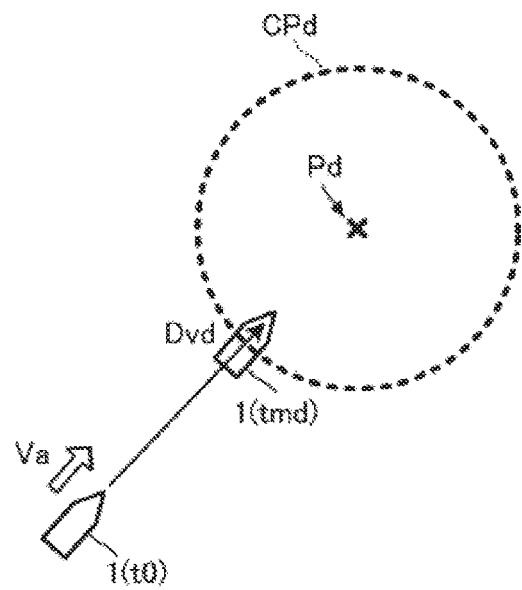
FIG. 10A is a view illustrating an outline of a ship body control during a watch mode.
Figure 10B:
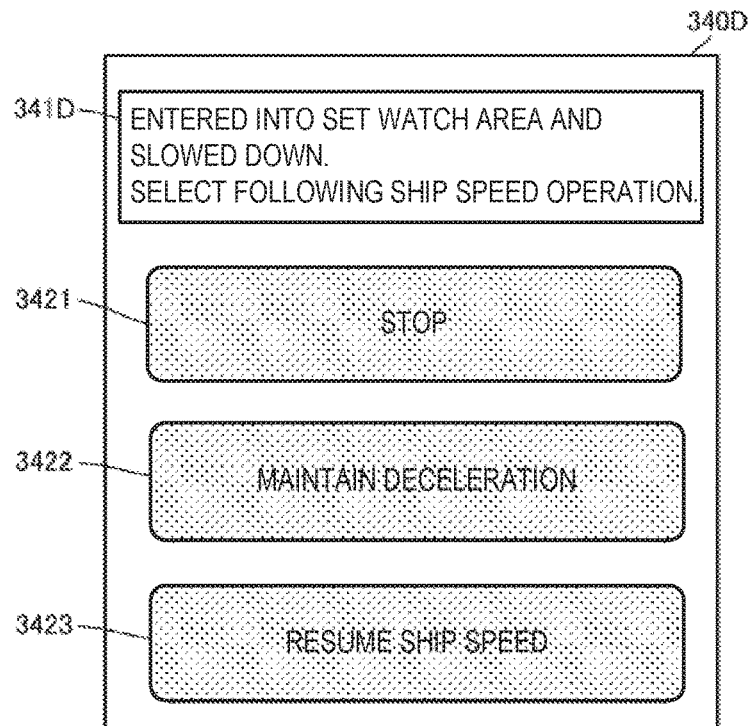
FIG. 10B is a view illustrating one display example of the contents of selection during the watch mode.

FIG. 10A is a view illustrating an outline of a ship body control during a watch mode, and FIG. 10B is a view illustrating one display example of the contents of a selection during the watch mode.

As illustrated in FIG. 10A, the AP controller 20 may store a watching point Pd and a watch area CPd. Setup of the watching point Pd and the watch area CPd can be performed by, for example, the UI part 30.

The ship 1 may enter into the watch area CPd during the automatic cruise at the automatic ship speed Va. The AP controller 20 may detect entering into the watch area CPd based on a relationship between the position coordinates of the ship by the sensor 40 and the position coordinates of the watch area CPd.

When the AP controller 20 detects that the ship 1 enters into the watch area CPd (see the position of the ship 1(*tmd*) in FIG. 10A), it may output a deceleration control instruction Dvd. Thus, the ship 1 may slow down from the automatic ship speed Va to the ship speed in the watch mode.

The AP controller 20 may output the deceleration control instruction Dvd and the contents of the selection of control after the deceleration (after the propelling force is reduced) to the UI part 30. The UI part 30 may display a selected contents notifying window 340D indicative of the contents of the selection on the display part 31.

As illustrated in FIG. 10B, the selected contents notifying window 340D may have a notifying window 341D, a stop button 3421, a deceleration maintaining button 3422, and a ship speed resuming button 3423. The AP controller 20 may display a notification of the deceleration start upon the entering into the watch area CPd and wording which urges a selection of operation, on the notifying window 341D. If the operational input part 32 detects an operation of the stop button 3421, the AP controller 20 may generate a stop control instruction of the propelling force, and output it to the propelling force controller 50. If the operational input part 32 detects an operation of the deceleration maintaining button 3422, the AP controller 20 may generate a control instruction for maintaining the speed Vd during the deceleration, and output it to the propelling force controller 50. If the operational input part 32 detects an operation of the ship speed resuming button 3423, the AP controller 20 may generate a control instruction for resuming the automatic ship speed Va, and output it to the propelling force controller 50.

By using this function, if the ship body control device 10 detects entering into the watch area CPd during the automatic cruise at the automatic ship speed Va, it may slow down the ship, and therefore, the safety upon cruising of the ship 1 can be secured. Further, the user can select the ship speed control after the deceleration, and the ship body control device 10 can realize the ship body control suitable for the situation of the ship by the easy operation of the user.

Figure 11:
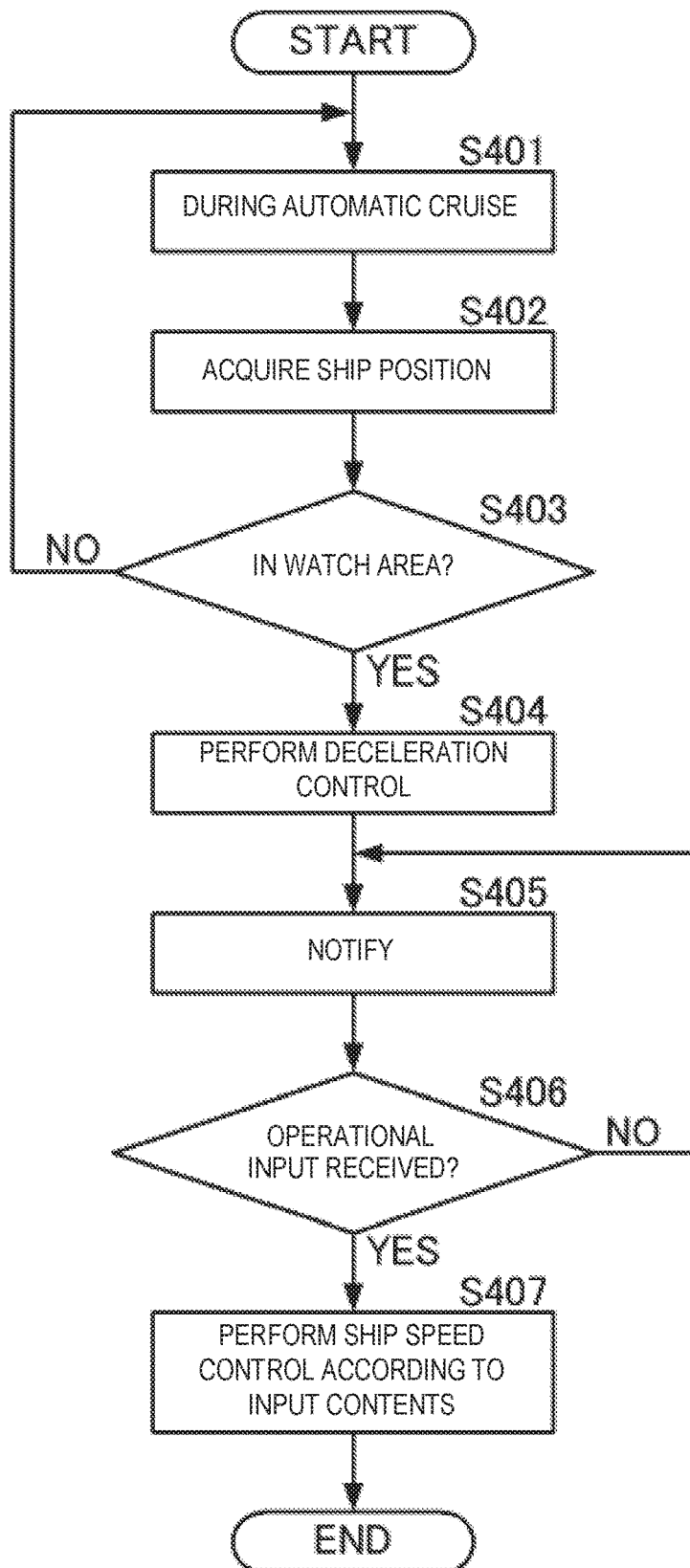
FIG. 11 is a flowchart of a control during an entering into a watch area.

The above-described control is implemented by, for example, the following method (program). FIG. 11 is a flowchart of the control during the entering into the watch area.

During the automatic cruise at the automatic ship speed Va (Step S401), the AP controller 20 may sequentially acquire the position coordinates of the ship (Step S402). Until the ship enters into the watch area CPd (Step S403: NO), the AP controller 20 may continue the automatic cruise. If the ship 1 enters into the watch area CPd (Step S403: YES), the AP controller 20 may output the deceleration control instruction Dvd to perform the deceleration control (Step S404).

The AP controller 20 may perform the notification of the deceleration control and the notification of the contents of the selection of control after the deceleration, through the UI part 30 (Step S405). Until the AP controller 20 accepts the operational input (Step S406: NO), it may continue the notification of the deceleration control and the notification of the contents of the selection of control after the deceleration.

If the AP controller 20 accepts the operational input (Step S406: YES), it may perform the ship speed control according to the contents of the input (Step S407). The ship speed control according to the contents of the input may be similar to that of the flow illustrated in FIG. 9, and therefore, description thereof is omitted.

(Ship Body Control During Detection of Posture Change)

Figure 12A:
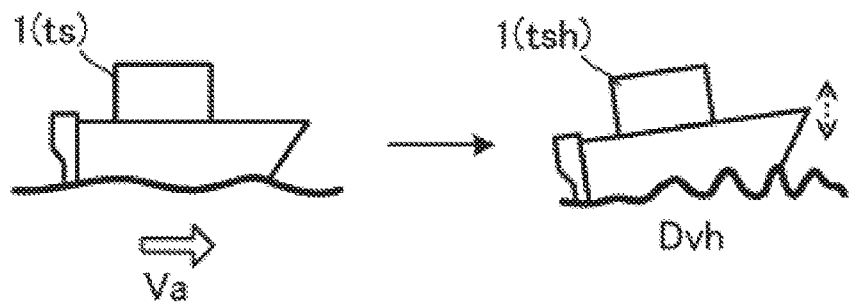
FIG. 12A is a view illustrating an outline of a ship body control during a detection of a posture change.
Figure 12B:
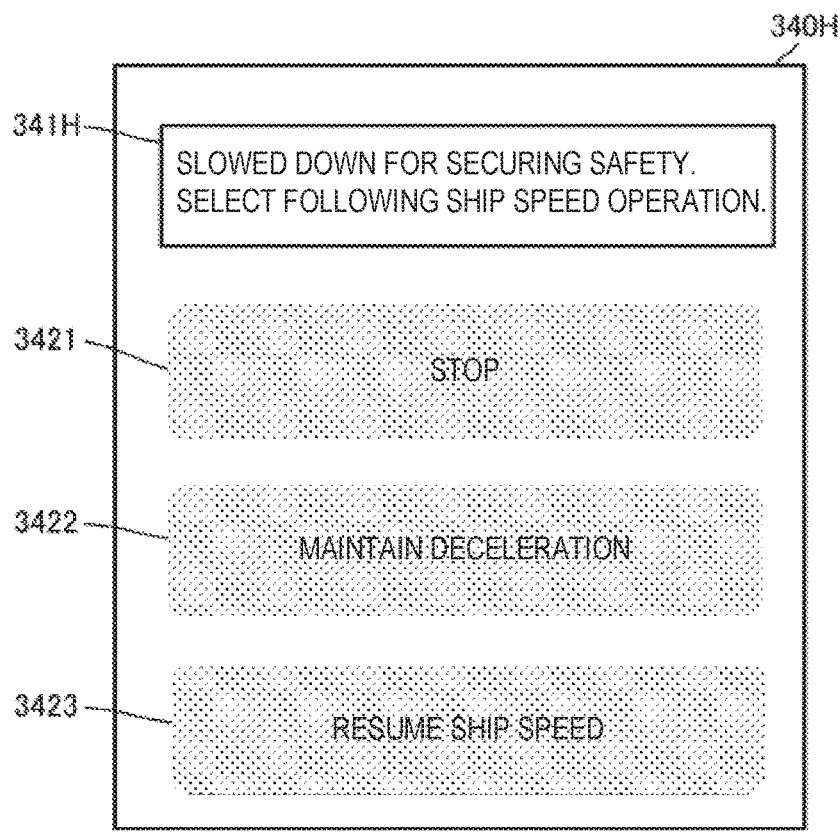
FIG. 12B is a view illustrating one display example of the contents of selection during the detection of the posture change.

FIG. 12A is a view illustrating an outline of a ship body control during a detection of a posture change, and FIG. 12B is a view illustrating one display example of the contents of a selection during the detection of the posture change.

When realizing this function, the sensor 40 may have a function for detecting the posture of the ship 1. The sensor 40 may detect the posture by using positioning signals, or detect the posture by using an inertia sensor. The sensor 40 may sequentially output the detected posture to the AP controller 20.

During the automatic cruise of the ship 1 at the automatic ship speed Va, the AP controller 20 may detect a change in the posture based on the posture acquired sequentially. The AP controller 20 may detect at least a change in a pitch angle as the change in the posture of the ship 1.

The AP controller 20 may store a threshold for an amount of change in the posture. When the amount of change in the posture exceeds the threshold, the AP controller 20 may output a deceleration control instruction Dvh. Thus, the ship 1 may slow down from the automatic ship speed Va.

The AP controller 20 may output the deceleration control instruction Dvh and the contents of the selection of control after the deceleration (after the propelling force is reduced) to the UI part 30. The UI part 30 may display a selected contents notifying window 340H indicative of the contents of the selection on the display part 31.

As illustrated in FIG. 12B, the selected contents notifying window 340H may have a notifying window 341H, a stop button 3421, a deceleration maintaining button 3422, and a ship speed resuming button 3423. The AP controller 20 may display a notification of the deceleration start due to the posture change and wording which urges a selection of operation, on the notifying window 341D. If the operational input part 32 detects an operation of the stop button 3421, the AP controller 20 may generate a stop control instruction of the propelling force, and output it to the propelling force controller 50. If the operational input part 32 detects an operation of the deceleration maintaining button 3422, the AP controller 20 may generate a control instruction for maintaining the speed Vd during the deceleration, and output it to the propelling force controller 50. If the operational input part 32 detects an operation of the ship speed resuming button 3423, the AP controller 20 may generate a control instruction for resuming the automatic ship speed Va, and output it to the propelling force controller 50.

By using this function, when the ship body control device 10 detects during the automatic cruise at the automatic ship speed Va the risk of cruising increases due to the posture change, it may slow down the ship, and therefore, the safety upon cruising of the ship 1 can be secured. Further, the user can select the ship speed control after the deceleration, and ship body control device 10 can realize the ship body control suitable for the situation of the ship by the easy operation of the user.

Figure 13:
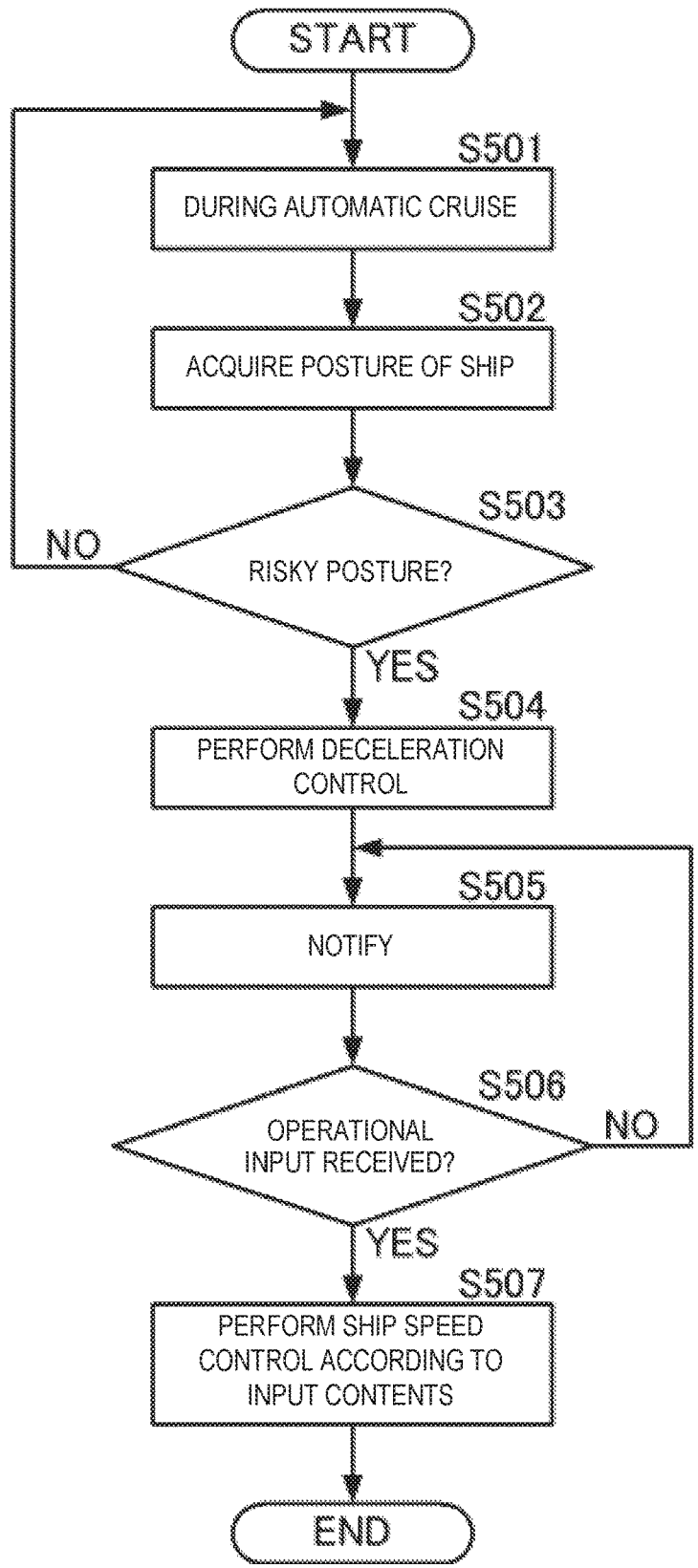
FIG. 13 is a flowchart of a control during the detection of the posture change.

The above-described control is implemented by, for example, the following method (program). FIG. 13 is a flowchart of a control during the detection of the posture change.

During the automatic cruise at the automatic ship speed Va (Step S501), the AP controller 20 may sequentially acquire the posture of the ship (Step S502). Until the AP controller 20 detects a risky posture (posture change) (Step S503: NO), it may continue the automatic cruise. If the AP controller 20 detects the risky posture (S503: YES), it may output the deceleration control instruction Dvh to perform the deceleration control (Step S504).

The AP controller 20 may perform the notification of the deceleration control and the notification of the contents of the selection of control after the deceleration, through the UI part 30 (Step S505). Until the AP controller 20 accepts the operational input (Step S506: NO), it may continue the notification of the deceleration control and the notification of the contents of the selection of control after the deceleration.

If the AP controller 20 accepts the operational input (Step S506: YES), it may perform the ship speed control according to the contents of the input (Step S507). The ship speed control according to the contents of the input may be similar to that of the flow illustrated in FIG. 9, and therefore, description thereof is omitted.

(Acceptance of Emergent Operation)

Figure 14A:
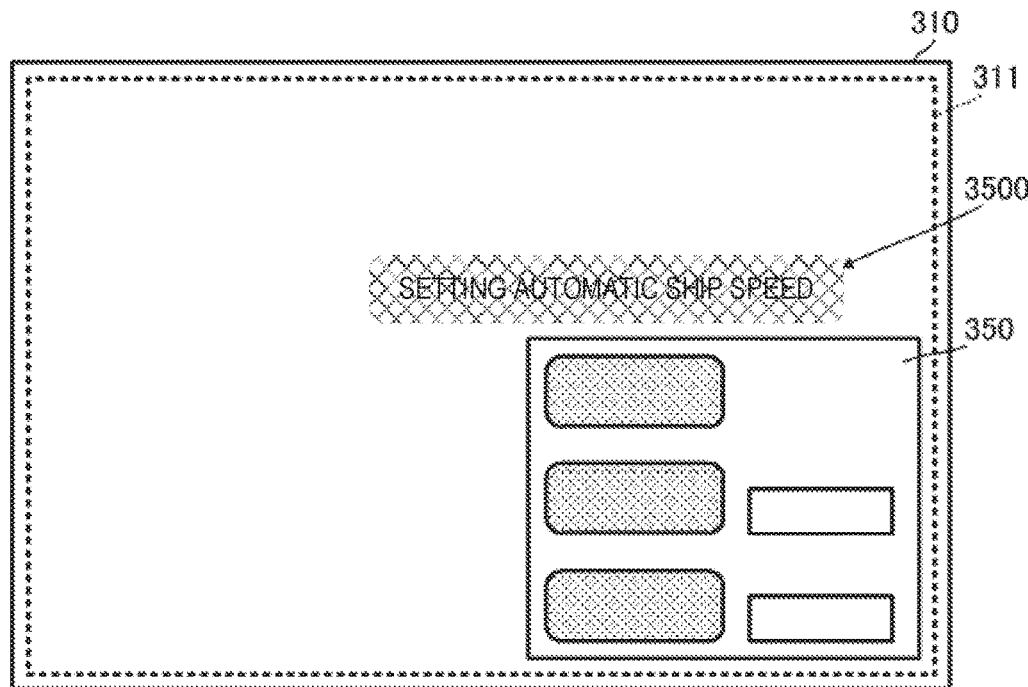
FIG. 14A is a view illustrating one display example during an automatic cruise.
Figure 14B:
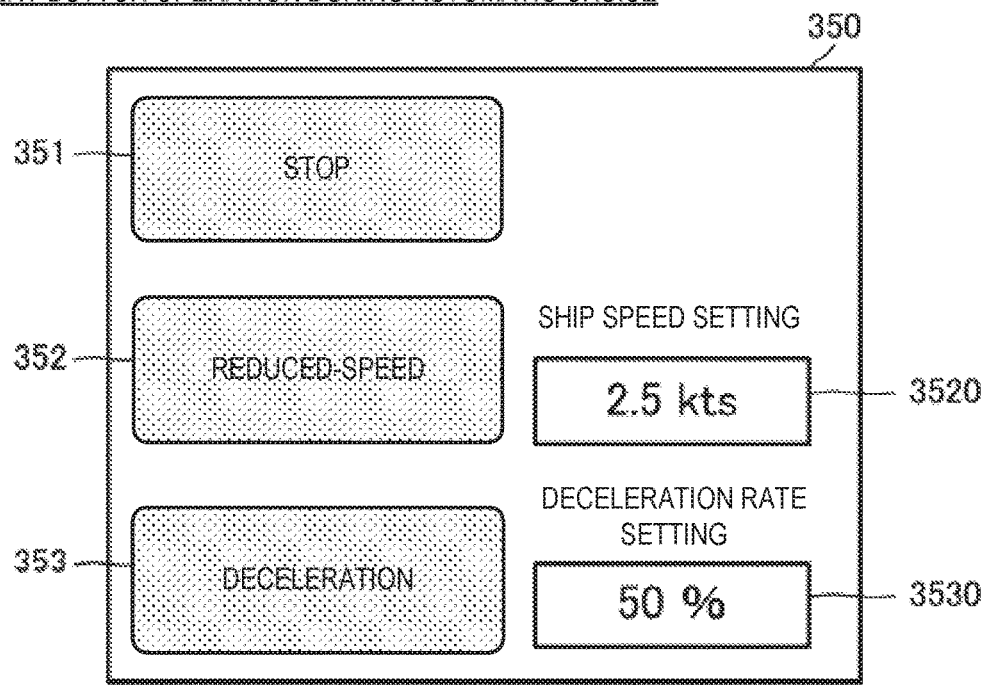
FIG. 14B is a view illustrating one example of an operation accepting window.

FIG. 14A is a view illustrating one display example during the automatic cruise, and FIG. 14B is a view illustrating one example of an operation accepting window.

As illustrated in FIGS. 14A and 14B, during the automatic cruise, the AP controller 20 may display a notice 3500 and an operational input accepting window 350 on the display screen 310.

The notice 3500 may describe the contents indicative of the automatic cruise at the constant automatic ship speed Va. For example, the notice 3500 may describe as "SETTING AUTOMATIC CRUISE."

As illustrated in FIGS. 14A and 14B, the operational input accepting window 350 may have a stop button 351 to accept an operation of a forced termination of the automatic cruise, a reduced-speed cruising button 352, a deceleration button 353, a reduced-speed display window 3520, and a deceleration rate display window 3530.

When the operational input part 32 detects an operation of the stop button 351, the AP controller 20 may perform a stop control of the propelling force similar to the above embodiments. If the operational input part 32 detects an operation of the reduced-speed cruising button 352, the AP controller 20 may perform the ship speed control so that the ship cruises at a reduced speed. The reduced speed may be set suitably. The reduced speed setting may be displayed on the reduced-speed display window 3520. If the operational input part 32 detects an operation of the deceleration button 353, the AP controller 20 may perform the deceleration control at the deceleration rate setting by using a method similar to the above embodiments. The deceleration rate may be set suitably. The deceleration rate setting may be displayed on the deceleration rate display window 3530.

By using this function, the ship body control device 10 can easily receive the operational input of a stop, a reduced-speed cruising, and a deceleration from the user through the operational input accepting window 350 during the automatic cruise at the automatic ship speed Va. Then, the ship 1 can quickly shift to the stop, the reduced-speed cruising, or the deceleration from the automatic cruise according to the operational input. Therefore, the ship body control device 10 can secure the safety during the automatic cruise.

Figure 15:
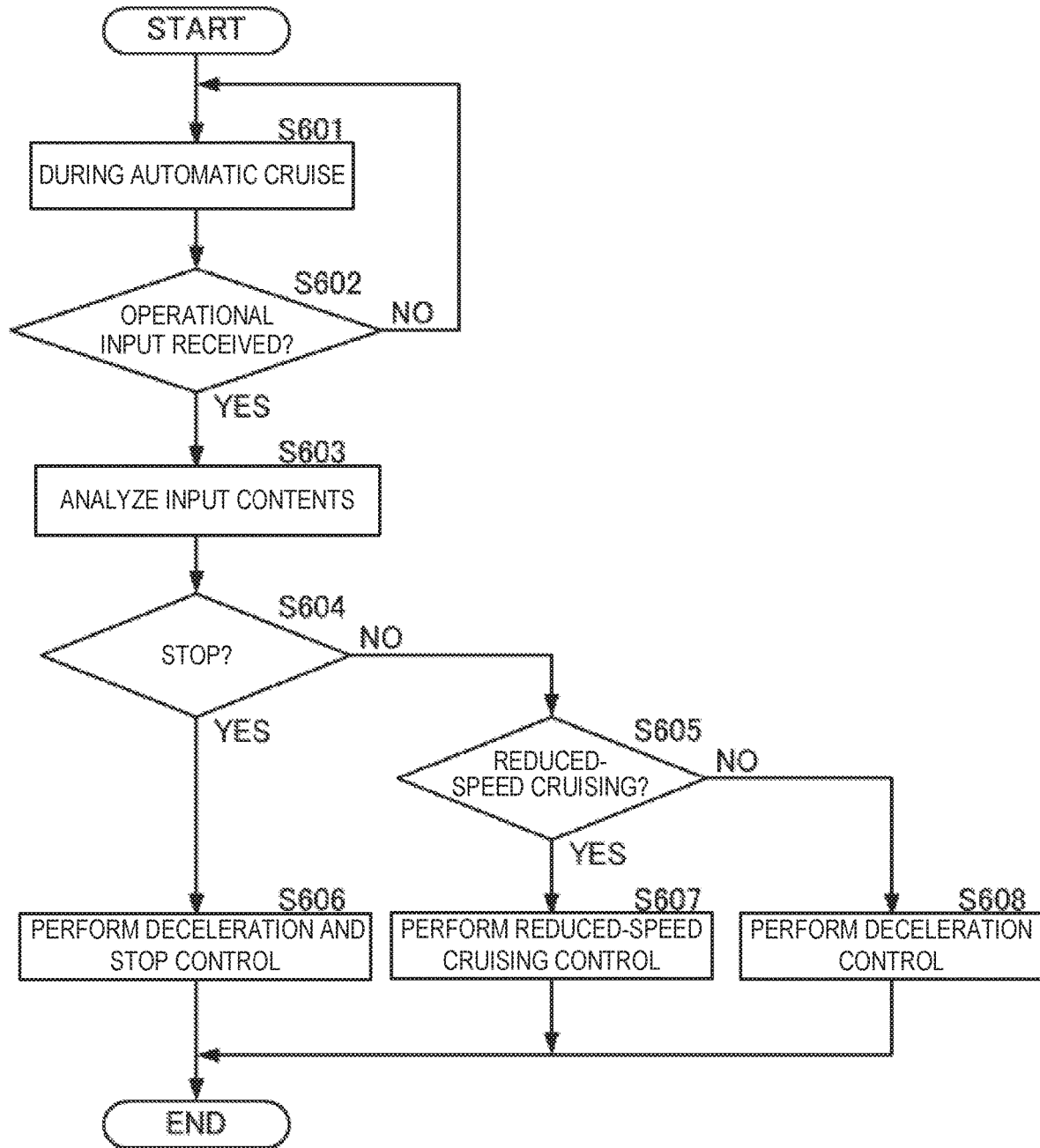
FIG. 15 is a flowchart of a control based on an operational input during the automatic cruise.

The above-described control is implemented by, for example, the following method (program). FIG. 15 is a flowchart of the control based on the operational input during the automatic cruise.

During the automatic cruise at the automatic ship speed Va (Step S601), the AP controller 20 may become in a state waiting for accepting the operational input. Until the AP controller 20 accepts the operational input (Step S602: NO), it may continue the automatic cruise. If the AP controller 20 accepts the operational input (Step S602: YES), it may analyze the contents of the operational input (Step S603).

If the AP controller 20 detects a stop (Step S604: YES), it may perform the deceleration and stop control (Step S606). If the AP controller 20 does not detect the stop (Step S604: NO) and detects the reduced-speed cruising (Step S605: YES), it may perform a reduce-speed cruising control (Step S607). If the AP controller 20 does not detect the stop and the reduced-speed cruising (Step S605: NO), it may perform the deceleration control (Step S608).

(Simplified Setting of Ship Speed and Rotating Speed of an Engine)

Figure 16:
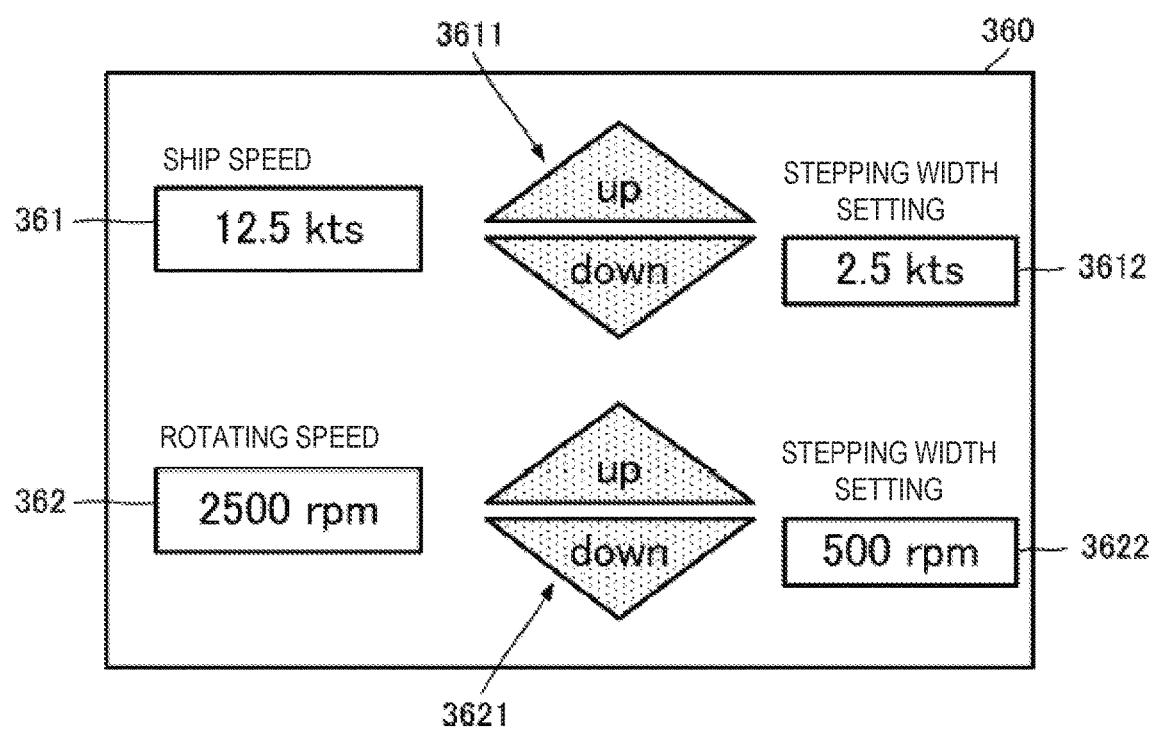
FIG. 16 is a view illustrating one example of a simplified setting window for a ship speed and a rotating speed.

FIG. 16 is a view illustrating one example of the simplified setting window for the ship speed and a rotating speed of an engine. As illustrated in FIG. 16, a simplified setting window 360 may be displayed on the display screen 310. The simplified setting window 360 may have a ship speed display window 361, a ship speed change icon 3611, a ship speed stepping width display window 3612, a rotating speed display window 362, a rotating speed change icon 3621, and a rotating speed stepping width display window 3622.

A current ship speed for the automatic cruise (automatic ship speed Va) may be displayed on the ship speed display window 361. The ship speed change icon 3611 may have an UP button and a DOWN button. By the UP button, the operational input which increases the automatic ship speed Va may be accepted. By the DOWN button, the operational input which decreases the automatic ship speed Va may be accepted. Here, a stepping width for increase and decrease may be displayed in the ship speed stepping width display window 3612. The stepping width may also be adjusted by directly operating the ship speed stepping width display window 3612. The AP controller 20 may perform a control for increasing or decreasing the automatic ship speed Va according to the stepping width.

The rotating speed corresponding to the current ship speed for the automatic cruise (automatic ship speed Va) may be displayed on the rotating speed display window 362. The rotating speed change icon 3621 may have an UP button and a DOWN button. By the UP button, the operational input which increases the rotating speed may be accepted. By the DOWN button, the operational input which decreases the rotating speed may be accepted. Here, a stepping width for increase and decrease may be displayed in the rotating speed stepping width display window 3622. The stepping widths may be adjusted by directly operating the rotating speed stepping width display window 3622. The AP controller 20 may perform a control for increasing or decreasing the rotating speed according to the stepping width.

By using this configuration, the user can easily confirm the automatic ship speed and the rotating speed corresponding to the automatic ship speed, and can easily adjust them to a desired speed and a desired rotating speed.

Figure 17:
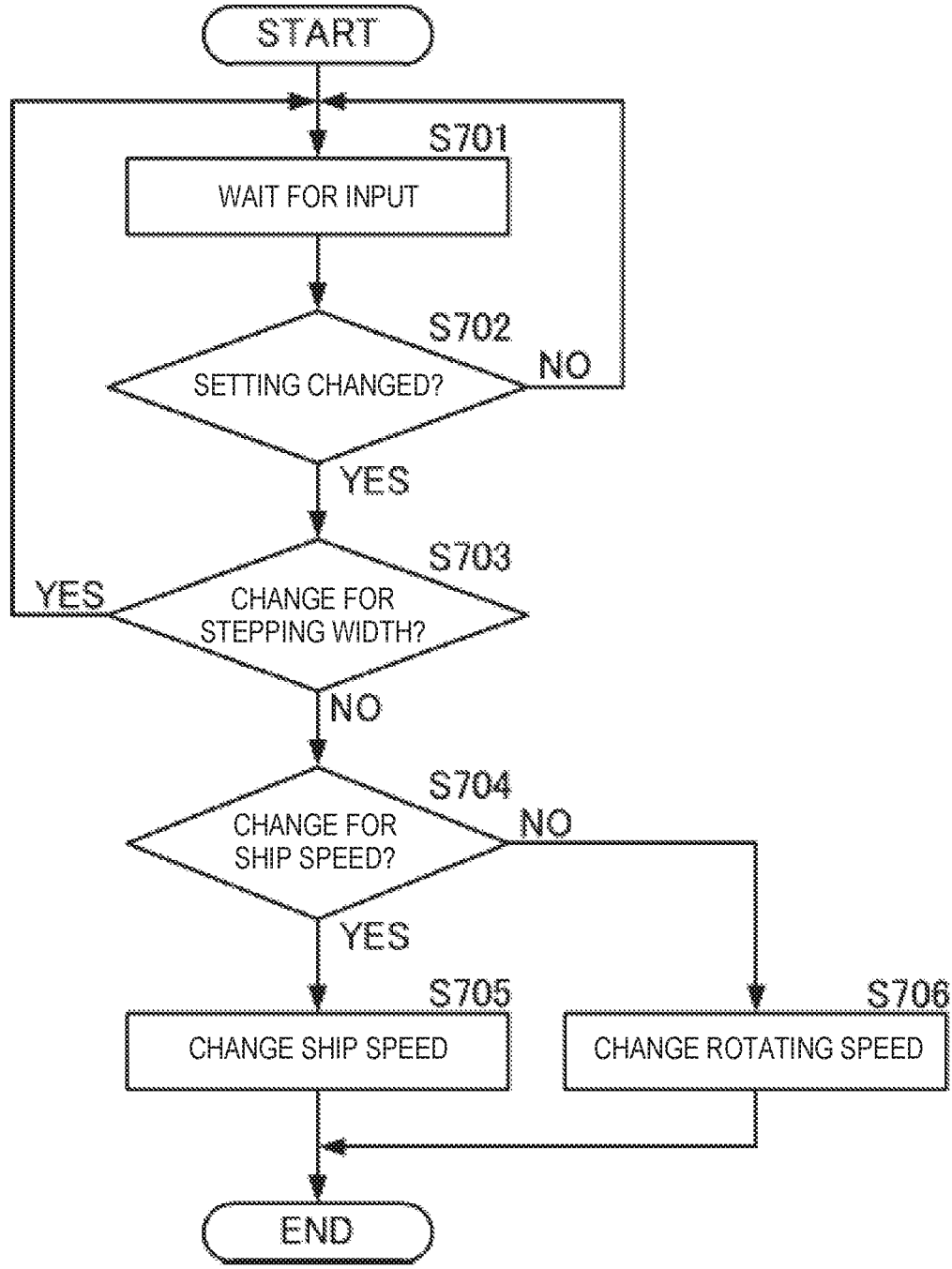
FIG. 17 is a flowchart of a setting control for the ship speed and the rotating speed.

The above-described control is implemented by, for example, the following method (program). FIG. 17 is a flowchart of the setting control for the ship speed and the rotating speed.

The AP controller 20 may be in a waiting state for the operational input (Step S701). Until the AP controller 20 detects the operational input for the setting change (Step S702: NO), it may maintain the operational input waiting state (Step S701). If the AP controller 20 detects the operational input for the setting change (Step S702: YES), it may confirm whether the operational input is a change for the stepping width. If it is the change for the stepping width (Step S703: YES), the AP controller 20 may change the stepping width and then returns to the input waiting state.

If it is not the change for the stepping width (Step S703: NO), the AP controller 20 may detect whether it is a change for the ship speed. If it is the change for the ship speed (Step S704: YES), the AP controller 20 may perform the control for changing the ship speed (Step S705). If it is not the change for the ship speed (Step S704: NO), i.e., if it is the change for the rotating speed, the AP controller 20 may change the rotating speed (Step S706).

(Simplified Setting of Automatic Ship Speed)

Figure 18:
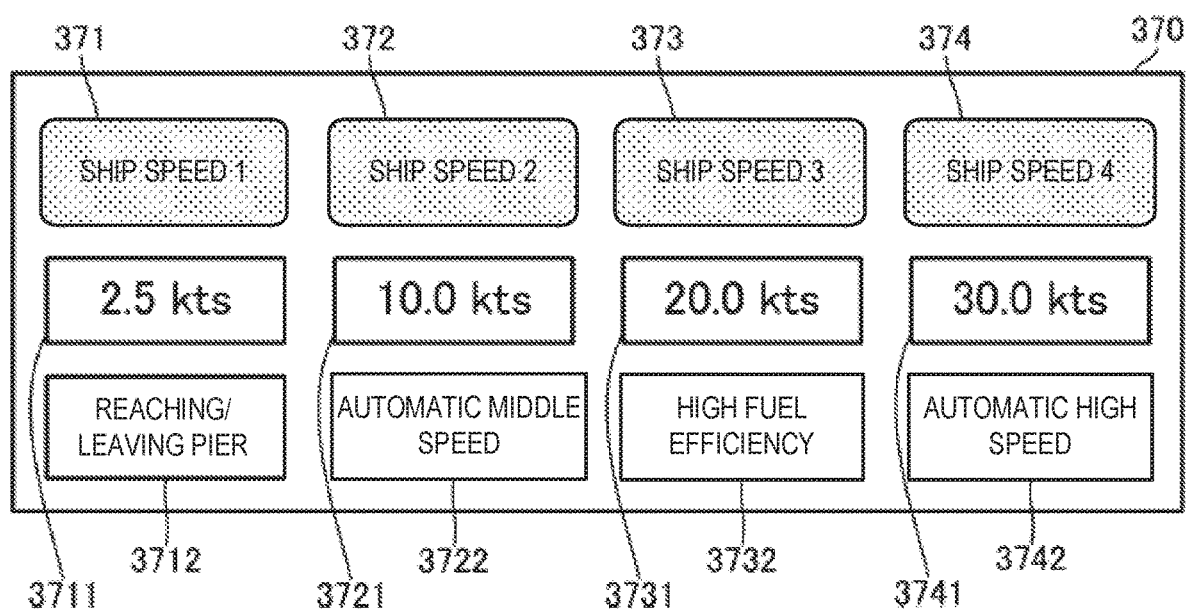
FIG. 18 is a view illustrating one example of a simplified setting window for an automatic ship speed.

FIG. 18 is a view illustrating one example of a simplified setting window for the automatic ship speed. As illustrated in FIG. 18, a simplified setting window 370 for the ship speed may have a plurality of ship speed name display marks 371, 372, 373, and 374, a plurality of ship speed display windows 3711, 3721, 3731, and 3741, and a plurality of remark display windows 3712, 3722, 3732, and 3742. The simplified setting window 370 for the ship speed may be displayed on the display screen 310.

The ship speed name display mark 371, the ship speed display window 3711, and the remark display window 3712 may be associated with each other. The ship speed name display mark 372, the ship speed display window 3721, and the remark display window 3722 may be associated with each other. The ship speed name display mark 373, the ship speed display window 3731, and the remark display window 3732 may be associated with each other. The ship speed name display mark 374, the ship speed display window 3741, and the remark display window 3742 may be associated with each other.

A simplified ship speed name may be indicated in each of the plurality of ship speed name display marks 371, 372, 373, and 374. The AP controller 20 may detect the selected ship speed name display mark, and set the automatic ship speed Va as the ship speed associated with the detected ship speed name display mark.

A ship speed setting (automatic ship speed) corresponding to the ship speed name associated with each of the plurality of ship speed display windows 3711, 3721, 3731, and 3741 may be indicated in the corresponding ship speed display window. The ship speed display windows 3711, 3721, 3731, and 3741 may be acceptable of an operation. The ship speed display windows 3711, 3721, 3731, and 3741 can be edited by this operation. Here, it is also possible to read the window of FIG. 16 and edit the ship speed in the window.

Remarks corresponding to the ship speed name associated with each of the plurality of remark display windows 3712, 3722, 3732, and 3742 may be indicated in the corresponding remark display window. For example, a situation where the corresponding automatic ship speed is used may be indicated in the remark display window. Note that other contents may also be indicated in the remark display window. The remark display windows 3712, 3722, 3732, and 3742 may be acceptable of an operation. The remark display windows 3712, 3722, 3732, and 3742 can be edited by this operation.

By using this configuration, the user can set the plurality of automatic ship speeds. The user can easily select the plurality of automatic ship speed according to the situation.

Figure 19:
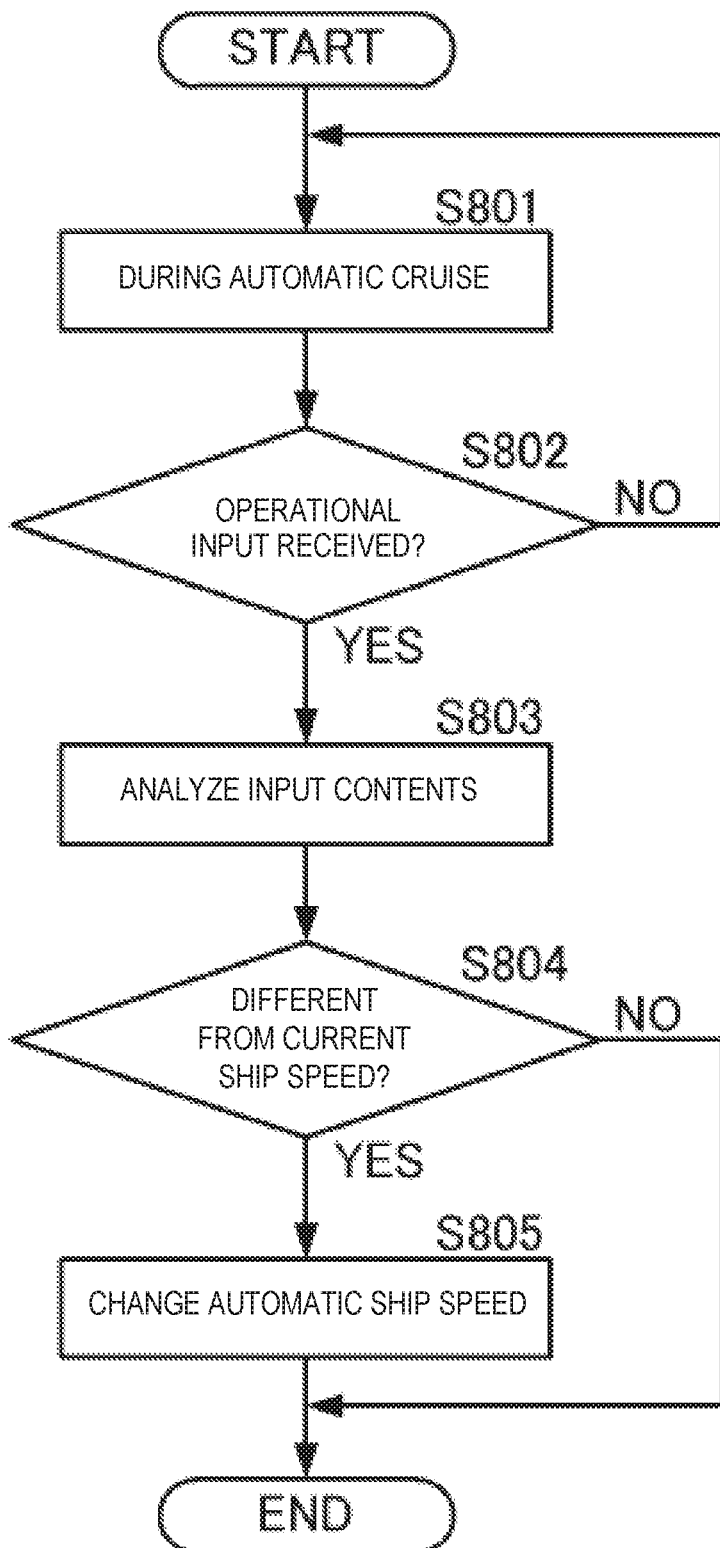
FIG. 19 is a flowchart of a selection setting control for the ship speed.

The above-described control is implemented by, for example, the following method (program). FIG. 19 is a flowchart of the selection setting control for the ship speed. Note that, below, although the automatic ship speed is changed during the automatic cruise, it may also be carried out at the start of the automatic cruise.

During the state of the automatic cruise (Step S801), until the AP controller 20 detects the operational input (Step S802: NO), it may continue the control so that the automatic cruise at the current automatic ship speed is maintained. If the AP controller 20 detects the operational input (Step S802: YES), it may analyze the contents of the input (Step S803).

If a new automatic ship speed accepted by the operational input differs from the current automatic ship speed (Step S804: YES), the AP controller 20 may perform the control for changing the automatic ship speed (Step S805). If the new automatic ship speed accepted by the operational input is the same as the current automatic ship speed (Step S804: NO), the AP controller 20 may continue the control so that the automatic cruise at the current automatic ship speed is maintained.

(Automatic Deceleration Control)

Figure 20A:
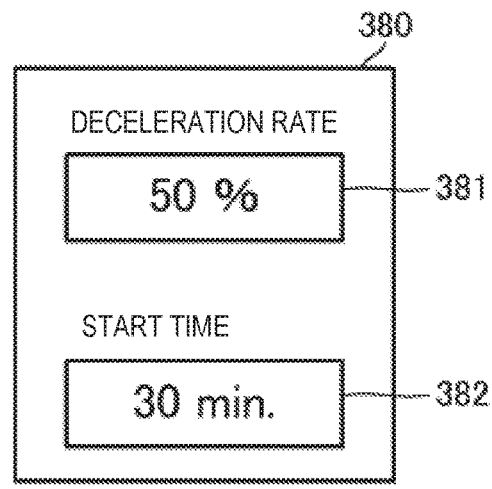
FIG. 20A is a view illustrating one example of a setting window for automatic deceleration.
Figure 20B:
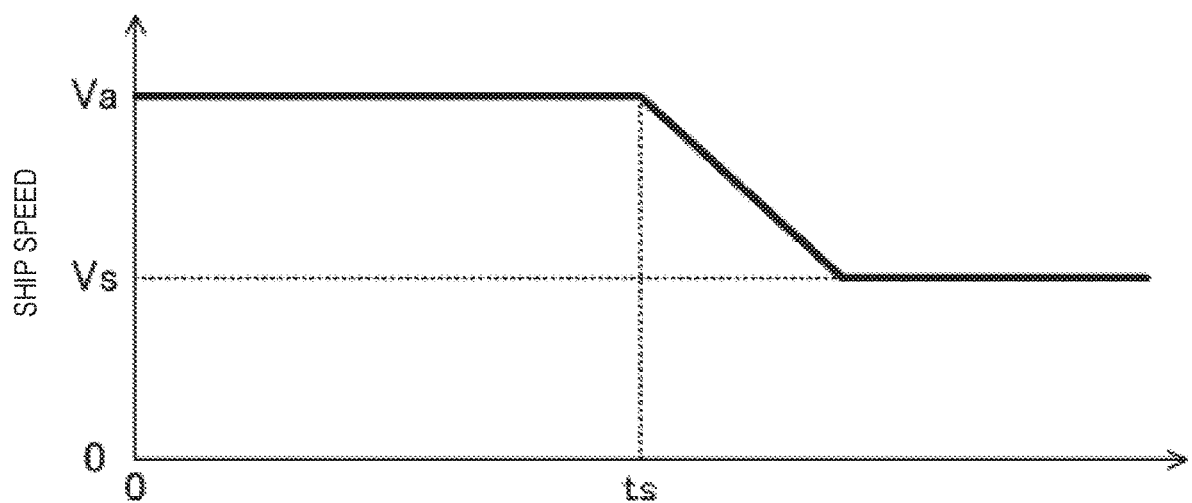
FIG. 20B is a graph illustrating a concept of the automatic deceleration.

FIG. 20A is a view illustrating one example of a setting window for the automatic deceleration, and FIG. 20B illustrates a graph illustrating a concept of the automatic deceleration. As illustrated in FIG. 20A, an automatic deceleration setting window 380 may have a deceleration rate display window 381 and a start time display window 382. The automatic deceleration setting window 380 may be displayed on the display screen 310.

A deceleration rate setting may be indicated in the deceleration rate display window 381. The deceleration rate display window 381 may be acceptable of an operation. The deceleration rate display window 381 can be edited by this operation. The AP controller 20 may perform the deceleration control by using the deceleration rate setting.

A start time setting of the deceleration may be indicated in the start time display window 382. A start time of the deceleration is, for example, a lapsed time from the start time of the automatic cruise. The start time display window 382 may be acceptable of an operation. The start time display window 382 can be edited by this operation. The AP controller 20 may have a timer function, and start the deceleration control by using the start time setting.

By this configuration, the ship body control device 10 may decelerate the ship 1 after a given period of time, even if the ship is under the automatic cruise. By this deceleration, the user may become easier to grasp the situation outside the ship 1, and therefore, the safety of the cruising may improve.

Figure 21:
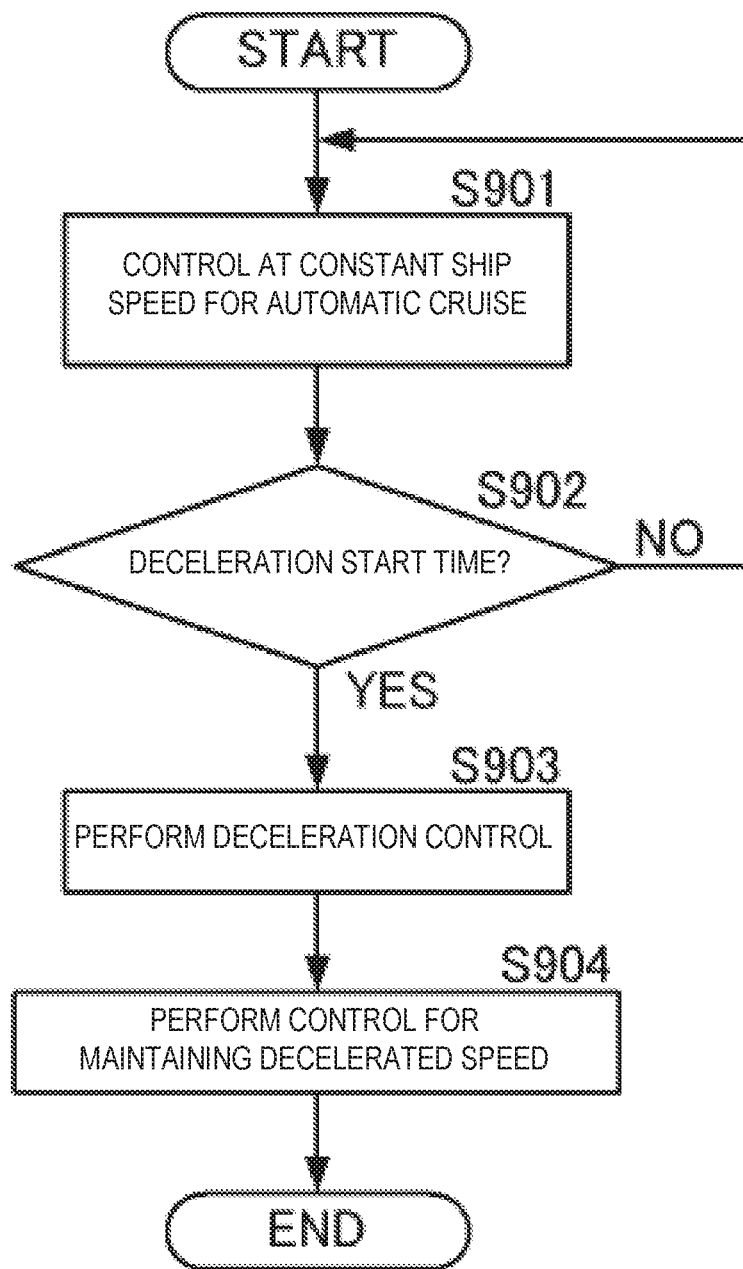
FIG. 21 is a flowchart of an automatic deceleration control.

The above-described control is implemented by, for example, the following method (program). FIG. 21 is a flowchart of the automatic deceleration control.

The AP controller 20 may control the ship speed at a constant ship speed (automatic ship speed) during the automatic cruise (Step S901). The AP controller 20 may count time, and until the start time setting (deceleration start time) (Step S902: NO), it may continue the control so that the automatic cruise at the current automatic ship speed is maintained. If it becomes the start time (deceleration start time) (Step S902: YES), the AP controller 20 may perform the deceleration control (Step S903). Then, the AP controller 20 may perform the control for maintaining the speed after the deceleration (decelerated speed) (Step S904).

Note that the functions described above may be suitably combined. The ship body control device 10 can demonstrate operation and effects according to each of the combinations.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship body control device, comprising:
a sensor configured to measure a speed of a ship; and
processing circuitry configured
to control a propelling force of the ship; and
to output an instruction to reduce the propelling force when a condition of canceling an automatic cruise in which the speed of the ship matches with an automatic ship speed setting is satisfied,
wherein
the sensor is configured to measure a position of the ship, and
the processing circuitry is configured to determine that the condition of canceling the automatic cruise is satisfied when the position of the ship enters into a heading change area determined based on a heading change point during the automatic cruise.

2. The ship body control device of claim 1, wherein the processing circuitry determines that the condition of canceling the automatic cruise is satisfied when the position of the ship enters into a destination area determined based on a destination point during the automatic cruise.

3. The ship body control device of claim 2, further comprising:
a user setting interface configured to set a watch area where a caution is needed when the ship enters into the watch area,
wherein the processing circuitry determines that the condition of canceling the automatic cruise is satisfied when the position of the ship enters into the watch area.

4. The ship body control device of claim 2, further comprising:
a user setting interface configured to accept an instruction of a return of the ship to a returning position,
wherein the processing circuitry determines that the condition of canceling the automatic cruise is satisfied when the instruction of the return is accepted.

5. The ship body control device of claim 1, further comprising: a user setting interface configured to set a watch area where a caution is needed when the ship enters into the watch area,
wherein the processing circuitry determines that the condition of canceling the automatic cruise is satisfied when the position of the ship enters into the watch area.

6. The ship body control device of claim 5, wherein the user setting interface is further configured to accept an operation for the speed of the ship,
wherein the processing circuitry notifies the contents of a selection of the speed of the ship for the control after the propelling force is reduced when the condition of canceling the automatic cruise is satisfied, and performs a control selected by the user setting interface.

7. The ship body control device of claim 1, further comprising:
a user setting interface configured to accept an instruction of a return of the ship to a returning position,
wherein the processing circuitry determines that the condition of canceling the automatic cruise is satisfied when the instruction of the return is accepted.

8. The ship body control device of claim 7, wherein the processing circuitry performs a return control to the returning position in which the ship speed is slower than the automatic ship speed setting after the automatic cruise is canceled.

9. The ship body control device of claim 1, wherein the sensor detects a target object around the ship, and
wherein the processing circuitry determines that the condition of canceling the automatic cruise is satisfied when the target object is detected in a risky area around the ship.

10. The ship body control device of claim 1, wherein the sensor measures a posture of the ship, and
wherein the processing circuitry determines that the condition of canceling the automatic cruise is satisfied when the posture of the ship is a risky posture during a cruise.

11. The ship body control device of claim 1, further comprising:
a user setting interface configured to accept an operation of a forced termination of the automatic cruise,
wherein the processing circuitry determines that the condition of canceling the automatic cruise is satisfied when the operation of the forced termination is accepted.

12. The ship body control device of claim 1, wherein the processing circuitry stores a time to a deceleration start at which the speed of the ship is reduced, and determines that the condition of canceling the automatic cruise is satisfied when the time to the deceleration start is lapsed.

13. The ship body control device of claim 1, wherein the processing circuitry estimates an estimated time of arrival to a destination point of a route set by the automatic cruise.

14. The ship body control device of claim 13, wherein the processing circuitry determines a heading change area and a deceleration rate of the automatic cruise based on the automatic ship speed setting, a heading change angle, and a heading change rate.

15. The ship body control device of claim 13, wherein the processing circuitry determines a destination area according to a destination point of the automatic cruise based on the automatic ship speed setting.

16. The ship body control device of claim 13, wherein the processing circuitry re-estimates and updates the estimated time of arrival when the processing circuitry outputs the instruction to reduce the propelling force from the automatic cruise setting.

17. The ship body control device of claim 1, further comprising:
a user setting interface configured to accept an instruction of a return of the ship to a returning position,
wherein the processing circuitry determines that the condition of canceling the automatic cruise is satisfied when the instruction of the return is accepted.

18. A method of controlling a ship body of a ship, further comprising:
measuring a speed of the ship;
controlling a propelling force of the ship;
reducing the propelling force when a condition of canceling an automatic cruise in which the speed of the ship matches with an automatic ship speed setting is satisfied;
measuring a position of the ship; and
determining that the condition of canceling the automatic cruise is satisfied when the position of the ship enters into a heading change area determined based on a heading change point during the automatic cruise.

19. A non-transitory computer-readable recording medium storing a program causing processing circuitry of a ship body control device of a ship to execute processing, the processing circuitry configured to control operation of the device, the processing by the processing circuitry comprising:
measuring a speed of the ship;
controlling a propelling force of the ship;
reducing the propelling force when a condition of canceling an automatic cruise in which the speed of the ship matches with an automatic ship speed setting is satisfied;
measuring a position of the ship; and
determining that the condition of canceling the automatic cruise is satisfied when the position of the ship enters into a heading change area determined based on a heading change point during the automatic cruise.

* * * * *